United States Patent
Bradley

(10) Patent No.: US 8,873,758 B2
(45) Date of Patent: Oct. 28, 2014

(54) SECURE WIRELESS LINK BETWEEN TWO DEVICES USING PROBES

(71) Applicant: Apple Inc., Cupertino, CA (US)

(72) Inventor: Bob Bradley, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/913,215

(22) Filed: Jun. 7, 2013

(65) Prior Publication Data

US 2013/0279698 A1 Oct. 24, 2013

Related U.S. Application Data

(63) Continuation of application No. 12/871,843, filed on Aug. 30, 2010, now Pat. No. 8,464,061.

(51) Int. Cl.

| | | |
|---|---|---|
| *H04K 1/00* | (2006.01) | |
| *H04W 8/00* | (2009.01) | |
| *H04W 12/04* | (2009.01) | |
| *H04W 12/06* | (2009.01) | |
| *H04W 84/18* | (2009.01) | |
| *H04W 84/12* | (2009.01) | |

(52) U.S. Cl.
CPC ............. *H04W 12/04* (2013.01); *H04W 8/005* (2013.01); *H04W 12/06* (2013.01); *H04W 84/18* (2013.01); *H04W 84/12* (2013.01)
USPC .......................... 380/270; 713/171; 380/277

(58) Field of Classification Search
None
See application file for complete search history.

(56) References Cited

U.S. PATENT DOCUMENTS

| | | | | |
|---|---|---|---|---|
| 7,325,134 | B2 * | 1/2008 | Fascenda | 713/169 |
| 7,370,350 | B1 * | 5/2008 | Salowey | 726/7 |
| 7,697,920 | B1 * | 4/2010 | McClain | 455/411 |
| 8,134,972 | B2 * | 3/2012 | Nakamura et al. | 370/331 |
| 8,151,336 | B2 * | 4/2012 | Savoor | 726/10 |
| 8,320,880 | B2 * | 11/2012 | Fok et al. | 455/411 |
| 8,351,607 | B2 * | 1/2013 | Ando et al. | 380/270 |
| 8,428,262 | B2 * | 4/2013 | Shiraki | 380/270 |
| 2005/0250472 | A1 * | 11/2005 | Silvester et al. | 455/411 |
| 2009/0060200 | A1 * | 3/2009 | Sheu et al. | 380/278 |
| 2010/0293370 | A1 * | 11/2010 | Xiao et al. | 713/155 |
| 2012/0082312 | A1 * | 4/2012 | Liu et al. | 380/262 |

\* cited by examiner

*Primary Examiner* — Fikremariam A Yalew

(74) *Attorney, Agent, or Firm* — Park, Vaughan, Fleming & Dowler LLP

(57) ABSTRACT

A secure wireless communication link (pairing) between two devices can be established using cleartext wireless transmissions between devices not joined to a network ("probes"). One device can broadcast a first probe indicating that it is seeking to establish a pairing. The other device can respond with a second probe, and the two devices can establish a shared secret, e.g., by exchanging further information using additional probes. Thereafter, either device can send a message to the other by encrypting the message using a cryptographic key derived from the shared secret; encrypted messages can also be sent within probes. The receiving device can extract an encrypted message from a probe and decrypt it using the cryptographic key. The encrypted message can include credentials usable by the receiving device to join a wireless network.

15 Claims, 11 Drawing Sheets

SECURE WIRELESS LINK BETWEEN TWO DEVICES USING PROBES

RELATED APPLICATION

The instant application is a continuation of, and hereby claims priority under 35 U.S.C.§120 to, pending U.S. patent application Ser. No. 12/871,843, which is titled "Secure Wireless Link Between Two Devices using Probes," by inventor Bob Bradley, which was filed on 30 Aug. 2010, and which is hereby incorporated by reference.

BACKGROUND

The present disclosure relates generally to wireless communication between electronic devices and more particularly to providing a secure wireless link between two devices.

Wireless networks have become ubiquitous. The Institute of Electrical and Electronics Engineers (IEEE) has promulgated the 802.11 family of standards, also referred to as "WiFi," for enabling electronic devices to communicate with each other. These standards (including 802.11a, 802.11b, 802.11g and 802.11n) define frequency, modulation, data rates, and message formats for communicating information between devices. In general, in an 802.11-compliant wireless network (also referred to as a "WiFi network"), there is a designated "access point," often with a wired connection to the Internet, that manages the WiFi network. Among other operations, the access point can route messages between networked devices. The WiFi network has a name (generally configurable by a network administrator interacting with the access point), which the access point can periodically broadcast, and devices that know the name or discover the network name from the access point's broadcast can join the network by sending a "join" request to the access point. In general, an access point will route messages only between devices that have joined the network.

Of course, wireless signals are easily intercepted. Accordingly, the WiFi standards provide various security protocols such as Wired Equivalent Privacy ("WEP"), WiFi Protected Access ("WPA"), and IEEE 802.11i (also known as "WPA2"). These protocols provide that information sent on the network is encrypted and specify particular encryption techniques to be used. The WiFi network access point can be configured for a particular security protocol.

In general, a device joining a secure WiFi network is required to know a network-specific password or key that can be used to encrypt and decrypt messages. While this password or key is generally not communicated wirelessly between devices, the access point in a secure WiFi network can require any device attempting to join the network to prove that it knows the password or key, e.g., by correctly encrypting a random challenge. To connect a computer to a secure WiFi network, a user can obtain the password from the network administrator and enter it into the computer, e.g., in response to a prompt generated by a network configuration program executing on the computer.

Recently, however, the universe of WiFi-enabled devices has begun to expand beyond computers to include a range of peripheral devices. For example, wireless printers that use 802.11 standards for communication have been developed. Some peripheral devices have a limited user interface, making it difficult or impossible for a user to enter a password or key for a WiFi network into the device. Often, it is necessary to first connect the peripheral device to a computer via a wired interface (e.g., USB) in order to configure the WiFi interface, then switch the peripheral device to a wireless operating mode.

BRIEF SUMMARY

Certain embodiments of the present invention provide techniques for establishing a secure wireless link (referred to herein as a "pairing") between two devices (referred to herein as a "controller" and an "accessory") by leveraging a wireless network protocol's support for exchange of messages between devices that have not yet joined a network. Such messages are referred to herein as "probe requests" and "probe responses," or more generally as "probes." In the case of wireless networks based on IEEE 802.11 standards, probe request and probe response frames can be used as the probes. The probes used herein can be used to exchange a sequence of messages between two WiFi-enabled devices, including computers, mobile devices, peripherals, and other devices. The sequence can include messages usable to establish a shared secret between two devices; once the shared secret is established, the two devices can securely communicate other messages, including but not limited to information (e.g., network name and password or other credentials) enabling one of the devices to join a wireless network.

Any two devices with suitably configured wireless interfaces can establish a pairing. In some embodiments described herein, one device (the "controller") can broadcast an initial probe to announce that it is searching for devices with which it can pair. Another device (the "accessory") can respond to the initial probe with another probe requesting a pairing. The two devices can establish a shared secret and/or verify that the other has the same shared secret. In some embodiments, the shared secret can be established and/or verified by exchanging further probes. In other embodiments, all the information needed to establish the shared secret can be provided in the initial exchange of probes, and the shared secret can be verified through another mechanism, such as user confirmation. Each device can use the shared secret to generate additional encryption and authentication keys. These latter keys can be used to secure (e.g., encrypt and/or authenticate) message content that can be transmitted between the devices using additional probe requests and probe responses.

In some embodiments, the secured message content exchanged between the devices can include credentials needed to join a secure wireless network, such as the network name and password or key. For example, an accessory with a limited user interface (e.g., a WiFi-enabled printer) can establish a pairing with a controller (e.g., a WiFi-enabled personal computer) and can obtain, via the pairing, the credentials for a wireless network to which the controller is currently joined. The accessory can then use these credentials to join the wireless network. Once the accessory has joined the wireless network, the accessory and controller can communicate with each other or other devices via that network. At this point, the pairing can be terminated, or the pairing link can be maintained as a sideband communication path.

In some embodiments, the pairing process can be largely automated, requiring little or no user intervention. Any user intervention can be as simple as verifying a passcode match between the accessory and controllers or entering a password provided by one device (e.g., the accessory) at the other device (e.g., the controller).

One aspect of the present invention relates to methods for establishing a wireless communication link between an accessory and a controller. A controller can broadcast a first probe to indicate that the controller is searching for an accessory with which to pair. An accessory can receive the first probe and respond with a second probe providing information about the accessory. The controller and accessory can establish a shared secret by exchanging respective public keys using additional probes, including a third probe sent by the accessory and a fourth probe sent by the controller. The controller and accessory can each validate that the other device shares the same secret and can each generate a further cryptographic key using the shared secret. Thereafter, either device can send a message to the other by encrypting the message using the further cryptographic key and sending the encrypted message within a fifth probe. The receiving device can extract the encrypted message from the fifth probe and decrypt it using the further cryptographic key. In some embodiments, the encrypted message can be sent with authentication data, allowing the recipient to verify the message's origin and integrity.

Another aspect of the invention relates to an accessory having a wireless interface. A processor coupled to the wireless interface can be configured to communicate with a controller to establish a pairing using a sequence of probes, to obtain credentials for joining a wireless network from the controller via the pairing, and to use the credentials to join the wireless network. Thereafter, assuming the controller is also on the same wireless network, the accessory and controller can communicate via the wireless network and/or via the pairing. In some embodiments the accessory can have a minimal user interface or no user interface; if desired, a user can control the pairing and network joining behavior of an accessory by interacting with a controller.

Another aspect of the invention relates to a controller having a wireless interface and a user interface. A processor coupled to the wireless interface and the user interface can be configured to communicate with an accessory to establish a pairing using a sequence of probes. Establishing the pairing can include communicating with a user via the user interface to confirm that the accessory should be allowed to join a wireless network and/or to obtain a password for the accessory, with the password being used in establishing the pairing. Once the pairing is established, the controller can send credentials for joining the wireless network to the accessory securely (e.g., as an encrypted message included in a probe sent to the accessory). Once the accessory joins the wireless network, the controller and accessory can communicate via the wireless network and/or via the pairing.

The following detailed description together with the accompanying drawings will provide a better understanding of the nature and advantages of the present invention.

DETAILED DESCRIPTION

Figure 1:
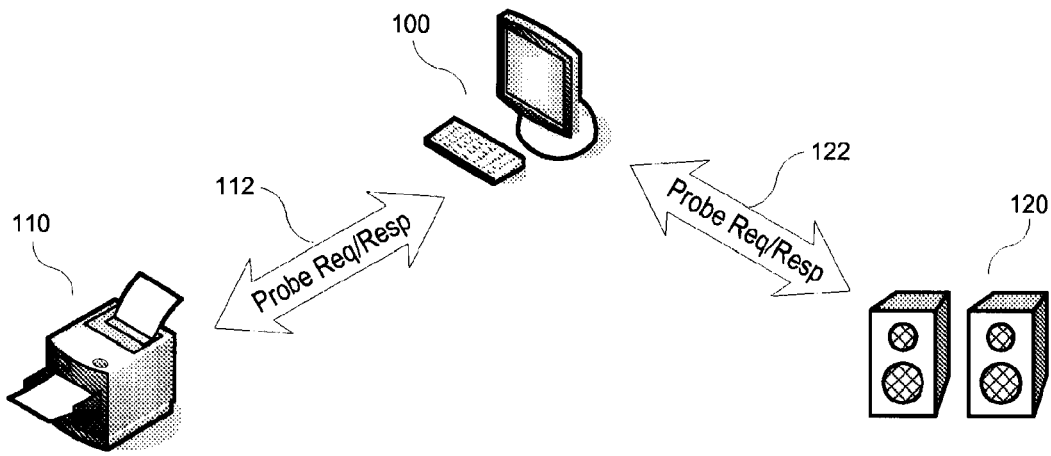
FIG. 1 illustrates an operating principle used in certain embodiments of the present invention.

Certain embodiments of the present invention provide techniques for establishing a secure wireless link (referred to herein as a "pairing") between two devices (referred to herein as a "controller" and an "accessory") by leveraging a wireless network protocol's support for exchange of messages between devices that have not yet joined a network. Such messages are referred to herein as "probe requests" and "probe responses," or more generally as "probes."

For example, the IEEE 802.11 standards provide that messages are sent in structures called "frames." The standards define a probe request frame that a device searching for a network to join can broadcast and a probe response frame that can be sent by an access point that receives a probe request. In this manner, a device can automatically identify available wireless networks. According to the standards, a probe request or probe response frame can incorporate an "information element," the content of which can be defined by a particular vendor.

Some embodiments of the present invention leverage the vendor-specific information elements of IEEE probe request and probe response frames to support exchange of a sequence of messages between any two WiFi-enabled devices, including computers and peripherals. The sequence can include messages establishing a shared secret between two devices; once the shared secret is established, the two devices can securely communicate other messages, including but not limited to information enabling one of the devices to join a standard WiFi network.

Any two devices with suitably configured wireless interfaces can establish a pairing. In some embodiments described herein, one device (the "controller") can broadcast an initial "browsing" probe to announce that it is searching for devices with which it can pair. The browsing signal can be included in an information element of an 802.11 probe request frame or within another type of probe request. Another device (the "accessory") can respond to the browsing probe with an identifying probe that includes accessory-identifying information. The identifying information can be included in an information element of an 802.11 probe response frame or within another type of probe. The two devices can establish a shared secret and/or verify that the other has the same shared secret. In some embodiments, the shared secret can be established and/or verified by exchanging further probes. In other embodiments, all the information needed to establish the shared secret can be provided in the initial exchange of probes, and the shared secret can be verified through another mechanism, such as user confirmation. Each device can then use the shared secret to generate additional encryption and authentication keys. These latter keys can be used to secure (e.g., encrypt and/or authenticate) message content that can be transmitted between the devices using additional probe requests and probe responses. For example, the secured (e.g., encrypted) message content can be included in an information element within an IEEE 802.11 probe request or probe response frame.

In some embodiments, the secured message content exchanged between the devices can include credentials needed to join a secure wireless network, such as the network name and password or key. For example, an accessory with a limited user interface (e.g., a WiFi-enabled printer) can establish a pairing with a controller (e.g., a WiFi-enabled personal computer) and can obtain, via the pairing, the credentials for a wireless network to which the controller is currently joined. The accessory can then use these credentials to join the wireless network.

Once the accessory has joined the wireless network, the accessory and controller can communicate with each other or other devices via that network. At this point, the pairing can be terminated, or the pairing link can be maintained as a sideband communication path.

In some embodiments, the pairing process can be largely automated, requiring little or no user intervention. Any user intervention can be as simple as verifying a passcode match between the accessory and controllers or entering a password provided by one device (e.g., the accessory) at the other device (e.g., the controller).

FIG. 1 illustrates an operating principle used in certain embodiments of the present invention. Shown in FIG. 1 are a controller 100, in this case a personal computer, and accessories 110 (e.g., a printer) and 120 (e.g., stereo speakers). Controller 100 and accessories 110, 120 each include a wireless communication interface, such as a standard WiFi card, and various other components, examples of which are described in detail below.

Controller 100 and accessory 110 can establish a secure, direct communication link (also referred to as a pairing) 112 by exchanging messages embedded in probe requests and probe responses. The term "probe" is also used herein to encompass both probe requests and probe responses interchangeably. Once pairing 112 is established, controller 100 and accessory 110 can send encrypted messages to each other using additional probes. Likewise, controller 100 and accessory 120 can establish a pairing 122 by exchanging messages embedded in probes. Once pairing 122 is established, controller 100 and accessory 120 can send encrypted messages to each other using additional probes.

The probes are sent wirelessly, and accessory 110 may detect probes associated with pairing 122. Similarly, accessory 120 may detect probes associated with pairing 112. To provide security, once a pairing is established, messages can be encrypted in a manner specific to the particular pairing; thus, for example, pairing 112 can provide a different cryptographic key from pairing 122. As a result, accessory 110 can be unable to decrypt messages contained in probes associated with pairing 122. (Similarly, accessory 120 can be unable to decrypt messages contained in probes associated with pairing 112). Specific examples of techniques for establishing a pairing, including establishing encryption keys specific to a pairing, are described below.

As shown in FIG. 1, in some embodiments, a single controller can be paired with multiple accessories concurrently. In some embodiments, controller 100 can be in the process of establishing only one pairing at a time; however, once one pairing (e.g., pairing 112) is established, controller 110 can establish a second pairing (e.g., pairing 122) while the first pairing remains available for use. In other embodiments, controller 100 can concurrently establish multiple pairings, e.g., if sufficient identifying information is included in the probe requests and probe responses that controller 100 can reliably determine the source of received messages and if each accessory is capable of determining whether it or another device is the target of a received message. In still other embodiments, controller 110 can be limited to establishing a pairing with one accessory at a time. Thus, for example, if accessory 110 begins pairing with controller 100, accessory 120 might be required to wait until pairing 112 is fully established. In alternative embodiments, if accessory 120 attempts to initiate pairing with controller 100 while accessory 110 is in process of establishing its pairing, controller 100 may terminate communication with accessory 110 to service the pairing request from accessory 120. Other rules for prioritizing pairing operations can also be used.

It will be appreciated that the devices shown in FIG. 1 are illustrative and that variations and modifications are possible. For example, while controller 100 is depicted as being a personal computer, controller 100 can also be another type of device, including but not limited to a laptop computer, tablet computer, smart phone, mobile communication or computing device, and so on. In addition, controller 100 need not be or include significant computing capability; any device capable of performing controller operations as described herein can be used as a controller.

Likewise, accessories 110 and 120 are depicted as, respectively, a printer and a pair of stereo speakers, but other types of accessories—including any device with a wireless communication interface—can also be used. Other examples of devices that can be accessories include peripheral devices, cameras, personal electronic devices including electronic medical devices, and household appliances. As with controller 100, any device capable of performing accessory operations as described herein can be used as an accessory. As will become apparent, an "accessory" is distinguished from a controller in that, during the pairing process, the accessory receives and responds to an initial probe request from the controller.

In some embodiments, an accessory can be a device that has limited or no user interface. For example, speakers 120 can produce sound but need not have any components capable of detecting user action (e.g., buttons, dials, touch-sensitive areas, etc.). Similarly, printer 110 can be capable of producing arbitrary images (in black and white or color depending on implementation) on paper and can have a display capable of displaying a few characters or simply status lights; the user input interface may provide only one or two control buttons. Such limited or nonexistent user interfaces can make it difficult or impossible for a user to input a network name, password, or other credential that may be required for joining a conventional secure wireless network. Some embodiments allow accessories to obtain network credentials wirelessly and securely, with little or no user interaction with the accessory, simplifying the task of connecting such accessories to a wireless network.

The terms "probe request" and "probe response" (or "probes") as used herein refer generally to messages that are sent outside the context of a particular wireless network. These messages can include identification of a sending device and/or requests for information about a receiving device. The messages can be broadcast, or in some embodiments, some messages can be unicast (i.e., addressed to a specific recipient) if the sender has identifying information for the recipient. Probes are generally sent in cleartext (although in some embodiments described below, an encrypted message can be embedded in a cleartext probe request or probe response). While IEEE 802.11-compliant probe request and probe response frames can be used, the invention is not limited to these specific frames or to networks compliant with IEEE 802.11 standards.

Figure 2:
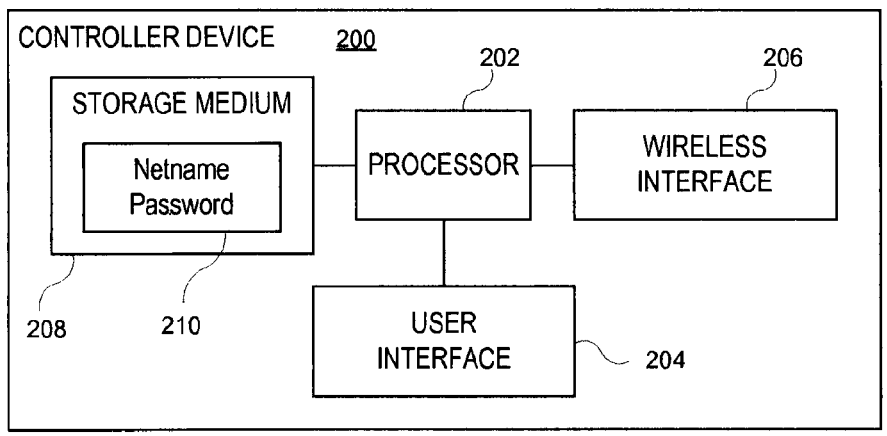
FIG. 2 is a block diagram of a controller according to an embodiment of the present invention.

FIG. 2 is a block diagram of a controller 200 according to an embodiment of the present invention. Controller 200 (e.g., implementing controller 100 of FIG. 1) can include various components such as a processor 202, a user interface 204, a wireless interface 206, and a storage medium 208.

Processor 202, which can be implemented as one or more integrated circuits (e.g., a conventional microprocessor or microcontroller), can control the operation of controller 200. In various embodiments, processor 202 can execute a variety of programs in response to program code and can maintain multiple concurrently executing programs or processes. At any given time, some or all of the program code to be executed can be resident in processor 202 and/or in storage media such as storage medium 208.

Through suitable programming, processor 202 can provide various functionality for controller 200. For example, in response to user input signals provided by user interface 204, processor 202 can launch application programs (word processor, web browser, etc.), play stored media content, control wireless interface 206 to establish or terminate network connections or send and receive data and other signals, and so on.

User interface 204 can include input devices such as a keyboard, touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 204 to invoke the functionality of controller 200 and can view and/or hear output from controller 200 via output devices of user interface 204.

Wireless interface 206 can provide data communication capability for controller 200. In some embodiments wireless interface 206 can include radio frequency (RF) transceiver components for accessing wireless voice and/or data networks (e.g., using advanced data network technology such as 3G, 4G or EDGE, WiFi (IEEE 802.11 family standards), or other wireless communication technologies, or any combination thereof). Wireless interface 206 can be implemented using a combination of hardware (e.g., antennas, modulators/demodulators, encoders/decoders, and other analog and/or digital signal processing circuits) and software components.

Storage medium 208 can be implemented, e.g., using disk, flash memory, or any other non-volatile storage medium. In some embodiments, storage medium 208 can store program code to be executed by processor 202 (including application and operating-system programs). This code can include program code related to establishing a pairing with an accessory as described below. Storage medium 208 can also store data such as media assets (audio, video, still images, etc.) that can be played or streamed to another device by controller 200, personal information electronic documents, and/or data files for a user, and other information. In some embodiments, storage medium 208 can store network credentials 210 (e.g., network name and password) associated with specific wireless networks to which controller 200 can connect via wireless interface 206.

It will be appreciated that controller 200 is illustrative and that variations and modifications are possible. Controller 200 may have capabilities not specifically described herein (e.g., mobile telephony, satellite-based navigation) and need not have media playback capabilities. The term "controller" is used herein to refer generally to any device that can respond to a request for a secure wireless link, or pairing, and subsequently establish a pairing with another device.

In some embodiments, controller 200 can also exchange information with a user or another device using other input/output channels. Examples of other input/output channels include analog signals on an audio line in or line out path (e.g., an audio jack); a camera, bar code reader or other imaging device in combination with an image analyzer (for input); a display screen that can produce machine-readable images (for output); sensors such as an accelerometer, gyroscope, or proximity detector (via which motion, orientation, or position of the device can be used to input information to controller 200); non-visible (e.g., infrared) light detectors and/or transmitters; ultrasonic detectors and/or transmitters; and so on.

Figure 3:
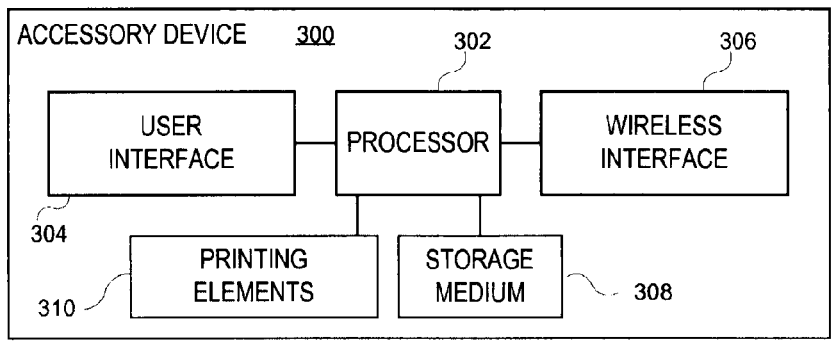
FIG. 3 is a block diagram of an accessory according to an embodiment of the present invention.

FIG. 3 is a block diagram of an accessory 300 according to an embodiment of the present invention. Accessory 300 (e.g., implementing printer accessory 110 of FIG. 1) can include a processor 302, a user interface 304, a wireless interface 306, a storage medium 308, and printing elements 310.

Processor 302, which can be implemented as one or more integrated circuits (e.g., a conventional microprocessor or microcontroller), can control the operation of accessory 300. In various embodiments, processor 302 can execute a variety of programs in response to program code and can maintain multiple concurrently executing programs or processes. At any given time, some or all of the program code to be executed can be resident in processor 302 and/or in storage media such as storage medium 308.

User interface 304 can be a simple interface like that of a conventional printer. For example, some printers provide a minimal interface with a small number of buttons and status indicator lights. Other printers provide more elaborate interfaces—e.g., including a character-line display or other display, together with a keypad, touch screen, or the like—that supports interactive menus to facilitate adjusting printer settings, selecting paper or paper path, canceling jobs, troubleshooting, etc. In some embodiments, a display of user interface 304 can be used to provide information to a user to validate a pairing, e.g., as described below.

Wireless interface 306 can provide at least data communication capability for accessory 300. In some embodiments wireless interface 306 can include radio frequency (RF) transceiver components for accessing wireless data networks (e.g., using 3G, 4G or EDGE, WiFi, or other mobile communication technologies, or any combination thereof). Wireless interface 306 can be implemented using a combination of hardware (e.g., antennas, modulators/demodulators, encoders/decoders, and other analog and/or digital signal processing circuits) and software components.

Storage medium 308 can be implemented, e.g., using disk, flash memory, or any other non-volatile storage medium. In some embodiments, storage medium 308 can store program code to be executed by processor 302 (including, e.g., printing control programs). This code can include program code related to establishing a pairing with a controller as described below.

Printing elements 310 can include various electronic and/or mechanical components such as paper feeders, ink jet apparatus, laser printing apparatus, and the like.

Figure 4:
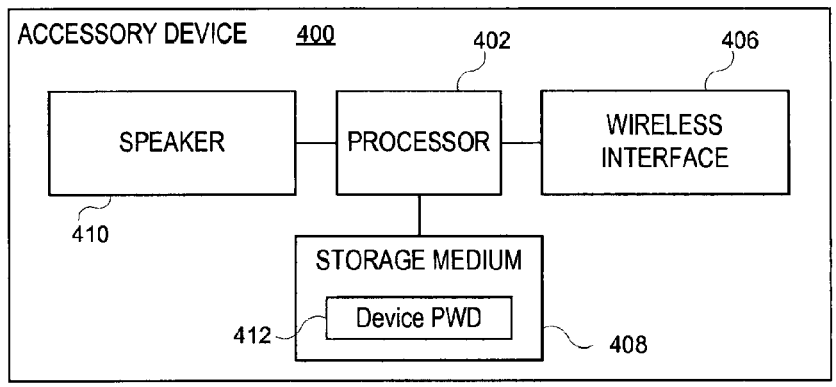
FIG. 4 is a block diagram of an accessory according to another embodiment of the present invention.

FIG. 4 is a block diagram of an accessory 400 according to another embodiment of the present invention. Accessory 400 (e.g., implementing speaker accessory 120 of FIG. 1) can include a processor 402, a wireless interface 406, a storage medium 408, and speaker 410.

Processor 402, which can be implemented as one or more integrated circuits (e.g., a conventional microprocessor or microcontroller), can control the operation of accessory 400. In various embodiments, processor 402 can execute a variety of programs in response to program code and can maintain multiple concurrently executing programs or processes. At any given time, some or all of the program code to be executed can be resident in processor 402 and/or in storage media such as storage medium 408.

Wireless interface 406 can provide at least data communication capability for accessory 400. In some embodiments wireless interface 406 can include radio frequency (RF) transceiver components for accessing wireless data networks (e.g., using 3G, 4G or EDGE, WiFi, or other mobile communication technologies, or any combination thereof). Wireless interface 406 can be implemented using a combination of hardware (e.g., antennas, modulators/demodulators, encoders/decoders, and other analog and/or digital signal processing circuits) and software components.

Storage medium 408 can be implemented, e.g., using disk, flash memory, or any other non-volatile storage medium. In some embodiments, storage medium 408 can store program code to be executed by processor 402 (including, e.g., code related to decoding digital audio received via wireless interface 406). This code can include program code related to establishing a pairing with a controller as described below. In some embodiments, storage medium 408 can also store a device password 412, which can be part of device firmware or hard-coded into the device. Device password 412 can be used when establishing pairings as described below.

Speaker 410 can include various electronic and/or mechanical components such as amplifiers, transducers, speaker cones, output jacks, or the like. In some embodiments, processor 402 can receive digital audio data via wireless interface 406, convert the data to analog signals, and provide the analog signals to a speaker driver within speaker 410. In some embodiments, speaker 410 can also include an auxiliary input jack (e.g., a standard 3.5-mm audio jack) and can receive analog audio signals via that path as well.

Unlike accessory 300, accessory 400 is not shown as having a user interface, and indeed an accessory need not have any user interface. In some embodiments, the user interface can be limited, e.g., to a power switch, input source selector, volume control, or the like.

It will be appreciated that accessories 300 and 400 are illustrative and that variations and modifications are possible. The term "accessory" as used herein refers generally to any device that can establish a pairing with a controller, and the communication link provided by the pairing can be used for any purpose, including but not limited to facilitating addition of the accessory to a network to which the controller already belongs. In some embodiments, data and control signals related to the accessory's function can be sent using the pairing link. Thus, accessories may be usable for a variety of purposes, including printing, playing sounds, displaying video, providing data (e.g., sensor readings) to the controller, receiving and processing data from the controller, and so on. Accessories are not limited to peripheral devices such as speakers or cameras; other examples include household appliances (e.g., refrigerators, conventional ovens, microwave ovens, laundry machines, etc.) and personal electronic devices (e.g., workout monitors, electronic medical devices). Any device with a wireless interface and suitable configuration can operate as an accessory.

Further, while the controller and accessories have been described with reference to particular blocks as shown in FIGS. 2-4, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 5:
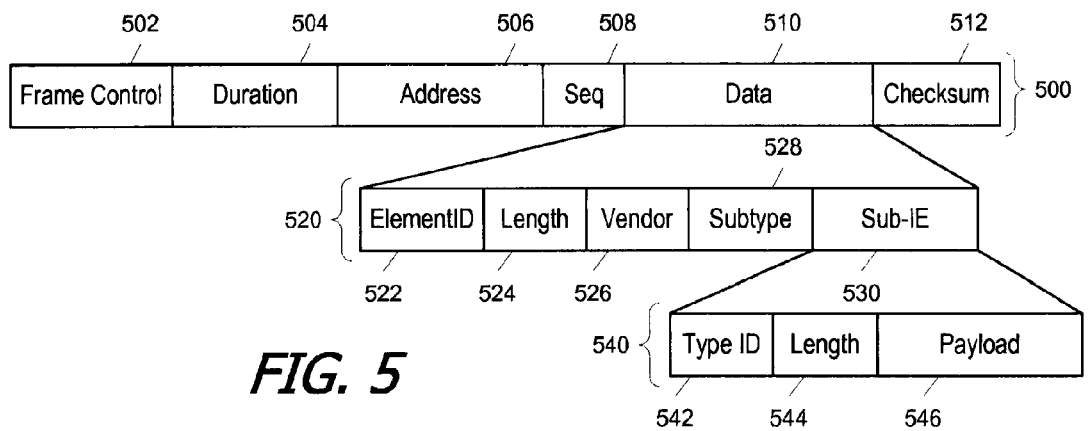
FIG. 5 is a block diagram of a probe frame structure usable in some embodiments of the present invention.

As described herein, a controller and an accessory can establish a wireless pairing by exchanging probes. FIG. 5 is a block diagram of a probe frame structure 500 usable in some embodiments of the present invention.

Probe frame structure 500 includes a number of fields; in some embodiments, some or all of these fields can correspond to the frame structure prescribed by IEEE 802.11 standards. For example, frame control field 502 can provide general information about the frame such as protocol version, type of frame (e.g., identifying it as a probe request or probe response frame), and other information usable by a receiving device to interpret a received wireless signal stream. Duration field 504 can provide duration information, e.g., as defined in IEEE 802.11 standards. Address field 506 can specify an address of a sender and an intended recipient of frame 500, as well as other address information, e.g., as specified in IEEE 802.11 standards. Sequence field 508 can contain sequence information usable to reconstruct a frame from multiple received fragments. Data field 510 can contain frame content, which includes data to be processed by the recipient. Checksum field 512 can include error detection and/or error correction codes, such as a 32-bit cyclic redundancy check.

Data field 510 for a probe request or probe response frame can include one or more information elements 520. Each information element ("IE") 520 can be a structure containing various fields. Element ID field 522 can identify the type of IE. For example, an information element can be a standard element or a vendor-specific element, and element ID field 522 can be used to indicate whether IE 520 is standard or vendor-specific. In embodiments described herein, vendor-specific information elements are presumed, but it will be appreciated that information elements described herein may become part of a future standard. Length field 524 indicates the length (e.g., in bytes) of IE 520. Vendor field 526 can include a unique identifier of a vendor associated with vendor-specific information element 520. The vendor can be, for example, a manufacturer of controllers capable of performing pairing operations as described herein. In some embodiments, the vendor identifier in field 526 can be a 24-bit Organizationally Unique Identifier (OUI) assigned by IEEE; other identifiers can also be used. Subtype field 528 can provide a vendor-assigned subtype. In some embodiments, subtype field 528 has a fixed value across all pairing-related probes and is used to indicate that information element 520 is for use in paring.

Sub-IE field 530 can contain one or more sub-IEs 540. As shown, sub-IE 540 provides a type identifier field 542 that indicates the type of information provided in the sub-element. Examples of types of information that can be provided include an opcode identifying an operation associated with IE 520 (e.g., searching for accessories to pair, negotiating a key, authenticating a shared secret, sending an encrypted message such as wireless network credentials); an address of a target device; a session identifier; a sequence number; a cryptographic key; a random nonce; an authenticator or digital signature; encrypted data; device capability and/or configuration information; device name (manufacturer and/or model name); network credentials (which can be encrypted, e.g., as described below). Examples of uses for various information types are described below.

Length field 544 can be used to indicate the length of sub-IE 540. Payload field 546 can contain the information identified by type identifier field 542.

It will be appreciated that the probe format described herein is illustrative and that variations and modifications are possible. In some embodiments, the probe frames are compliant with IEEE 802.11 standards defining probe request and probe response frames, but other probe formats can also be used. Any data structure usable to transmit information between devices where at least one of the devices is not joined to a wireless network can be used as a probe.

Examples of processes that can be used to establish a pairing between an accessory and a controller will now be described.

Figure 6:
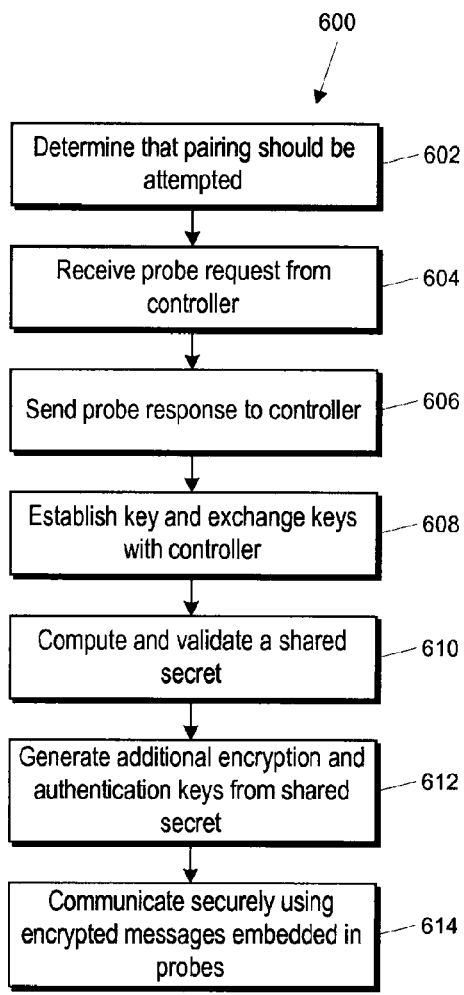
FIG. 6 is a flow diagram of a process usable by an accessory to establish a pairing with a controller according to an embodiment of the present invention.

FIG. 6 is a flow diagram of a process 600 usable by an accessory to establish a pairing with a controller according to an embodiment of the present invention. Process 600 starts at block 602 when an accessory (e.g., accessory 300 or accessory 400) determines that it should attempt to create a pairing. In some embodiments, this determination is made automatically during a startup process of the accessory; in other embodiments, the user may operate a control of the accessory to initiate the process. In still other embodiments, whether to attempt to create a pairing automatically at startup or wait for a specific instruction is a configurable parameter of the accessory.

At block 604, the accessory can listen for and receive a "browsing" probe request from a controller, indicating that the controller is searching (or browsing) for accessories with which it can pair. In some embodiments, the browsing probe request can be received as a probe frame 500 as described above. In this instance, probe frame 500 can contain (e.g., within sub-IE field 530) an opcode indicating that the controller is searching or browsing for accessories with which to pair. The browsing probe request can be broadcast, e.g., by not specifying a recipient address. In the case of 802.11-compliant networks, it is typical that only access points listen for and respond to probe requests; other devices ignore them. Since probe requests are broadcast in the clear, however, devices other than access points can detect and respond to probe requests.

At block 606, the accessory can send a probe response to the controller. In some embodiments, the probe response can be sent as a probe frame 500 as described above. In this instance, probe frame 500 can include (e.g., within sub-IE field 530) identifying information about the accessory, such as a manufacturer's name, model name, and specific capabilities information such as whether the accessory can perform key negotiation dynamically or based on a stored password. The probe response can be addressed to the controller from which a probe request was received at block 604. If multiple probe requests are received at block 604, the accessory can select a controller. In some embodiments, the accessory selects the first controller from which a probe request was received; in other embodiments, the last controller. In still other embodiments, other selection rules can be used, or if the accessory has a user interface capable of prompting a user, the accessory can prompt the user to select a controller with which the accessory should pair.

At block 608, the accessory and the controller can establish and exchange public cryptographic keys. In some embodiments, public keys are exchanged using additional probes. Where probe frames 500 are used, the keys can be incorporated as sub-IEs in sub-IE field 530; other formats can also be used. In some embodiments, keys can be negotiated dynamically; in other embodiments, key generation can be based on a fixed password associated with the accessory. Examples of pairing processes that use each of these techniques are described below.

At block 610, the accessory can compute a shared secret and can validate the controller by confirming that the controller has the same shared secret. For example, the accessory and the controller can each display some information that is based on the shared secret. Both displays should match if both have the same secret, and a user can be asked to verify the match. Alternatively, the accessory and the controller can each use a random challenge to verify that the other has the same shared secret. Examples of pairing processes that use each of these techniques are described below.

At block 612, the accessory can generate additional encryption and authentication keys based on the shared secret. At block 614, the accessory can communicate securely with the controller using the additional keys. For example, the accessory can use the keys to encrypt a message, then send the encrypted message in an information element (or other data item) within a probe. Similarly, the accessory can receive a probe that contains an encrypted message from the controller and can use the keys to decrypt and authenticate the message. Communication through the pairing at block 614 can continue indefinitely; when communication is complete, process 600 can end.

Figure 7:
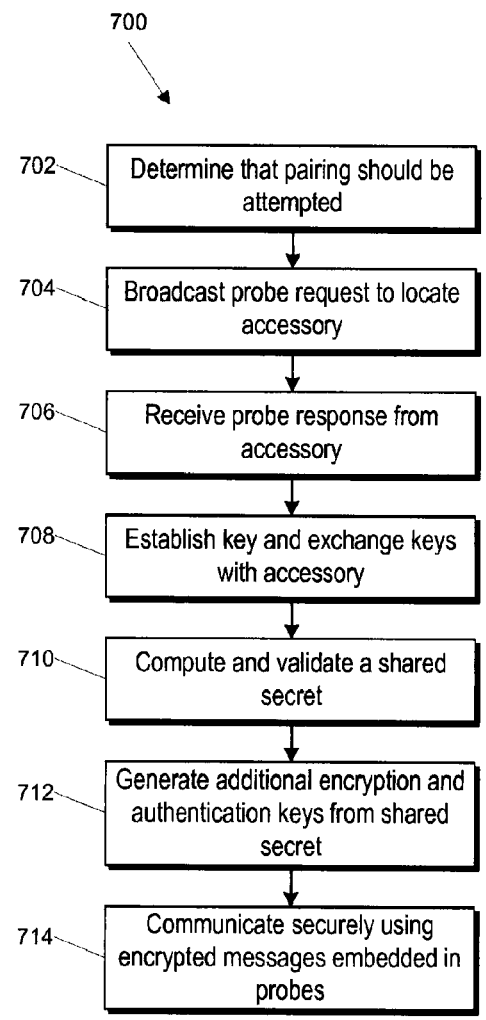
FIG. 7 is a flow diagram of a process usable by a controller to establish a pairing with an accessory according to an embodiment of the present invention.

FIG. 7 is a flow diagram of a process 700 usable by a controller to establish a pairing with an accessory according to an embodiment of the present invention. Process 700 starts when a controller determines at block 702 that pairing with an accessory should be attempted. For example, a user may instruct the controller to search for accessories with which to pair.

At block 704, the controller can broadcast a browsing probe request indicating that the controller is browsing for accessories capable of pairing. In some embodiments, the probe request can be broadcast as a probe frame 500 as described above. In this instance, probe frame 500 can contain (e.g., within sub-IE field 530) an opcode indicating that the controller is searching or browsing for accessories with which to pair. The probe request can include an indication that it is broadcast, e.g., by not specifying a recipient address.

At block 706, the controller can receive a probe response from the accessory. In some embodiments, the probe response can be sent as a probe frame 500 as described above. In this instance, probe frame 500 can include (e.g., within sub-IE field 530) identifying information about the accessory, such as a manufacturer's name, model name, and specific capabilities information such as whether the accessory can perform key negotiation dynamically or based on a stored password. The probe response can be addressed to the controller. In some embodiments, the controller can receive multiple probe responses at block 706.

In some embodiments, the controller can prompt the user before proceeding further. For example, the controller can display a message asking the user whether the accessory should be connected; this message can include accessory-identifying information extracted from the probe request. If the user authorizes the connection, the controller can proceed. Where probe responses from multiple accessories are received at block 706, the controller can ask the user to select an accessory with which to pair. In other embodiments, a controller can proceed with pairing without first obtaining user authorization.

At block 708, the controller and the accessory can establish and exchange public cryptographic keys. In some embodiments, public keys are exchanged using additional probes. Where probe frames 500 are used, the keys can be incorporated as sub-IEs in sub-IE field 530; other formats can also be used. In some embodiments, keys can be negotiated dynamically; in other embodiments, key generation can be based on a fixed password associated with the accessory. Examples of pairing processes that use each of these techniques are described below.

At block 710, the controller can compute a shared secret and can validate the accessory by confirming that the accessory has the same shared secret. For example, the controller and the accessory can display some information based on the shared secret that should match if both have the same secret, and the user can verify the match. Alternatively, the controller and the accessory can each use a random challenge to verify that the other has the same shared secret. Examples of pairing processes that use each of these techniques are described below.

At block 712, the controller can generate additional encryption and authentication keys based on the shared secret. At block 714, the controller can communicate securely with the accessory using the additional keys. For example, the controller can use the keys to encrypt a message, then send the encrypted message in an information element (or other data item) within a probe. Similarly, the controller can receive a probe that contains an encrypted message from the accessory and can use the keys to decrypt and authenticate the message. Communication through the secure pairing link provided at block 714 can continue indefinitely; when communication is complete, process 700 can end.

It will be appreciated that processes 600 and 700 are illustrative and that variations and modifications are possible. Steps described as sequential may be executed in parallel, order of steps may be varied, and steps may be modified, combined, added or omitted. For instance, various sequences of probe requests and probe responses can be used to establish security (keys, shared secret, etc.) for the pairing. A variety of cryptographic techniques and algorithms can be used; some examples are described below. The probes can be probe request and probe response frames compliant with IEEE 802.11 or messages in other formats compliant with other wireless networking protocols. In general, it is expected that probes are sent in the clear (i.e., non-encrypted); any device with suitable capability can read the messages. Within a pairing, security can be provided by encrypting the message content prior to embedding it (e.g., as an information element or other data item) within a cleartext probe, e.g., in the manner described above.

In some embodiments, pairing can be completed using as few as two probes. For example, the initial probe request sent by the controller can include the controller's public key, and the initial probe response sent by the accessory can include the accessory's public key. (Thus, block 608 can occur together with blocks 604 and 606; likewise, block 708 can occur together with blocks 704 and 706.) Validation of the shared secret can also be performed without exchanging further probes; examples are described below.

Once a secure pairing link has been established using processes 600 and 700, any type of information can be communicated via the link, subject only to implementation-dependent bandwidth constraints. In some embodiments, the accessory can use the pairing provided at block 614 to obtain credentials for a wireless network (e.g., a name and password or key for a protected IEEE 802.11 network) from the controller; the accessory can then use these credentials to join that network. Once the accessory has joined the wireless network, communication through the pairing link can be discontinued, although in some embodiments, such communication can continue, providing a communication sideband.

Other types of information that can be communicated via a pairing link include configuration parameters and/or control signals for the accessory, the controller, or both. Thus, for example, a paired accessory can act as a remote control device for a controller (by sending commands to the controller within a probe) or vice versa. Data can be streamed between devices if the bandwidth provided by the probes is sufficient. (For current IEEE 802.11 standards, the bandwidth provided by probe request and probe response frames is generally not sufficient for high-quality media streaming; other implementations may provide higher bandwidth.)

Figure 8A:
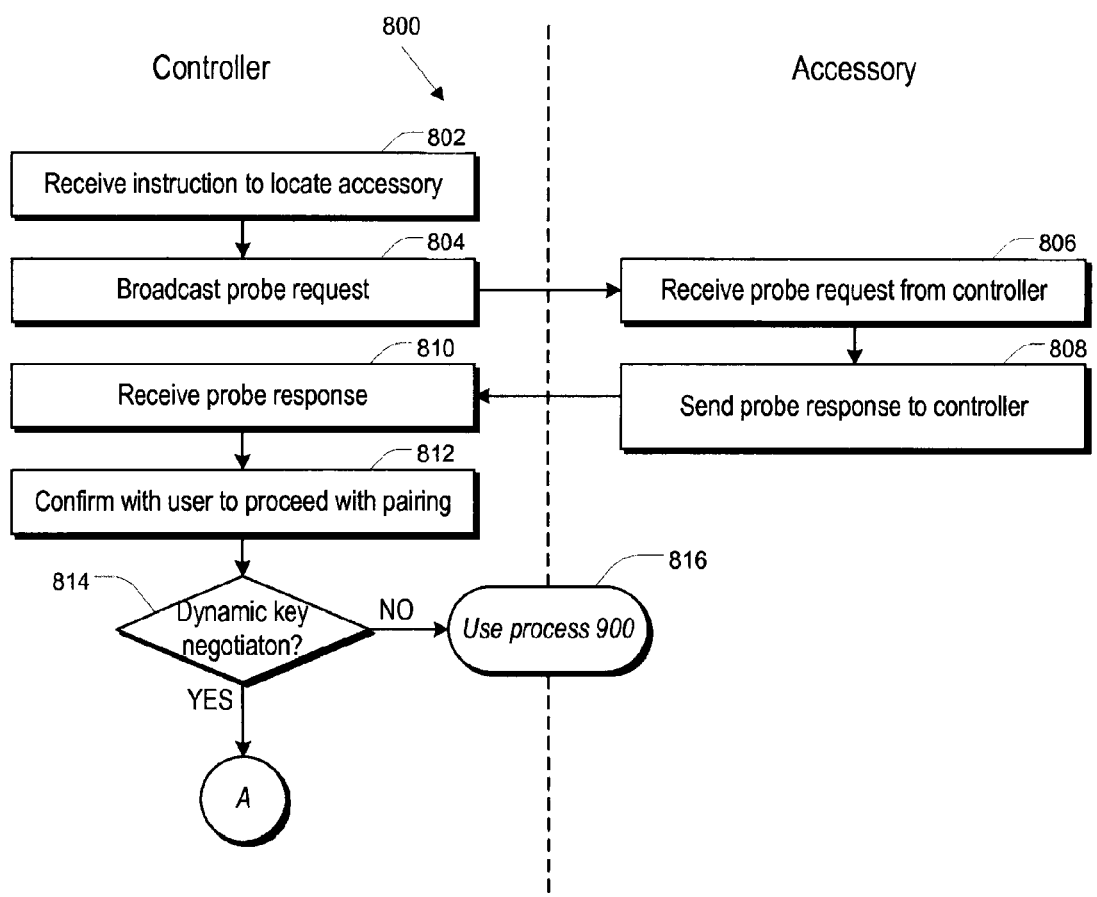
FIGS. 8A-8B are a flow diagram of a process for establishing a pairing between a controller and an accessory according to an embodiment of the present invention.
Figure 8B:
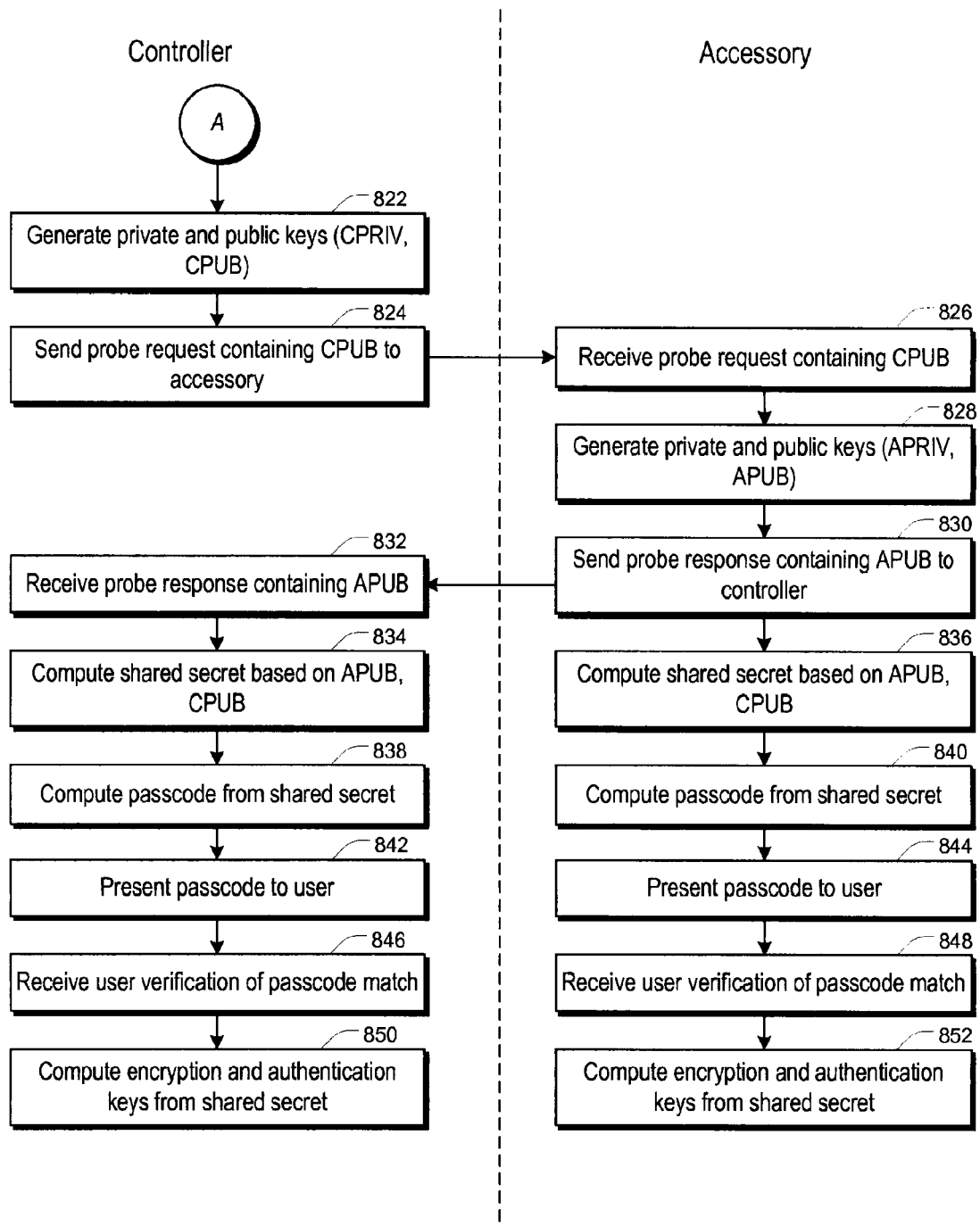

As noted above, some embodiments provide dynamic key negotiation and validation at blocks 608 and 610 (or 708 and 710) while other embodiments provide key negotiation and validation based on a fixed device password. FIGS. 8A-8B are a flow diagram of a process 800 that provides both alternatives according to an embodiment of the present invention.

At block 802, a controller (e.g., controller 200) can receive an instruction, e.g., from a user, to locate an accessory with which to pair. For example, an application program executed by the controller can include a user interface with a control the user can operate (e.g., by selecting from a menu) to instruct the controller to search for accessories available for pairing. In other embodiments, instructions to locate an accessory may be automatically generated (e.g., at regular intervals) during operation of the controller, and user initiation is not required. At block 804, the controller can broadcast a probe request (e.g., as described above) to browse for accessories capable of pairing. This can be generally similar to block 704 of process 700 described above.

At block 806, an accessory can receive the probe request from the controller. At block 808, the accessory can respond by sending a probe response (e.g., as described above) to the controller. This can be generally similar to block 606 of process 600 described above.

At block 810, the controller can receive the probe response from the accessory. At block 812, the controller can confirm with the user whether to proceed with pairing. As noted above, in some embodiments the controller can display a message asking the user whether the accessory should be connected; this message can include accessory-identifying information extracted from the probe request. If the controller receives probe responses from multiple accessories, block 812 can include prompting the user to select an accessory with which to pair. Assuming the user confirms that pairing should proceed, the controller can proceed. In other embodiments, a controller can proceed with pairing without first obtaining user authorization, and block 812 can be omitted.

At block 814, the controller can determine whether the accessory uses dynamic key negotiation or fixed-password-based keys. If the accessory does not use dynamic key negotiation, the sequence shown in FIGS. 9A-9B and described below can be used, as indicated at block 816.

For dynamic key negotiation, the remaining portion of process 800 is shown in FIG. 8B. At block 822, the controller can generate its private key ("CPRIV") and public key ("CPUB"). In one embodiment, the controller can generate 32 bytes of cryptographically strong random data, convert the data to a private key CPRIV using a cryptographic algorithm such as Curve25519 (an elliptic curve Diffie-Hellman approach, documented at http://cr.yp.to/ecdh.html), and compute a public key CPUB from CPRIV. Other techniques for generating a public-private key pair can be substituted.

At block 824, the controller can send the public key CPUB to the accessory using a probe request. Public key CPUB can be included as an information element or other data item. The public key can be sent as cleartext. The controller can also include other information within one or more information elements in the probe request, such as a unique session ID that can thereafter be included in all probe requests and probe responses associated with the pairing session. Use of a session ID can assist the controller and the accessory in determining the state of the pairing link (e.g., whether key negotiation is in progress or completed) and processing received probe requests and probe responses accordingly. In some embodiments, the other information can also include a unique sequence identifier (unique within the session) that allows probe responses to be matched to specific probe requests.

At block 826, the accessory can receive the probe request containing the controller's public key CPUB. The accessory can generate its own private key ("APRIV") and public key ("APUB") at block 828. In one embodiment, the accessory can generate 32 bytes of cryptographically strong random data, convert the data to a private key APRIV using a cryptographic algorithm such as Curve25519, and compute a public key APUB from APRIV. Other techniques for generating a public-private key pair can be substituted; in general, compatible techniques should be used at blocks 822 and 828. At block 830, the accessory can send its public key APUB to the controller using a probe response.

At block 832, the controller can receive the probe response and extract APUB. At this stage, the controller and the accessory are each in possession of both public keys APUB and CPUB.

At blocks 834 and 836, the controller and the accessory, respectively, can compute a shared secret based on the public keys APUB and CPUB. In some embodiments, the shared secret is computed using Curve25519; other cryptographic algorithms can be substituted. In general, both devices should use the same algorithm to provide a shared secret (i.e., one secret known to both devices).

At blocks 838 and 840, the controller and the accessory, respectively, can compute a passcode from the shared secret. For example a hash algorithm such as SHA-256 can be applied to the shared secret or to some function of the shared secret. The result, or a portion thereof, can be converted to an alphanumeric character string (e.g., 8 characters) that can be used as a passcode. While a variety of techniques can be used in passcode generation, the accessory and controller should use techniques that result in matching or correlated passcodes. At blocks 842 and 844, the controller and the accessory, respectively, present their computed passcodes to a user. For example, controller 200 can display the passcode on its display. A printer accessory (e.g., accessory 300) can display the passcode on its user interface display or print a page containing the passcode. The user can compare the two passcodes to confirm that they match, e.g., by operating input controls on the controller and/or the accessory to confirm the match. At blocks 846 and 848, the accessory and the controller, respectively, can receive this confirmation. In some embodiments, the user can provide confirmation via the user interface of just one device (e.g., the controller), which can communicate the confirmation to the other device (e.g., the accessory) by sending a probe. If confirmation is not received, the device (or devices) not receiving confirmation can discontinue process 800.

In some embodiments, an accessory might not be capable of displaying a passcode. For example, speaker accessory 120 as shown in FIG. 1 does not have a display device. In such cases, password-based authentication, e.g., as described below with reference to FIGS. 9A-9B, can be used instead.

Assuming the passcode is verified, at blocks 850 and 852, the controller and the accessory, respectively, can generate additional encryption and authentication keys from the shared secret. Such keys can be derived, e.g., using standard techniques such as Advanced Encryption Standard ("AES," documented at http://en.wikipedia.org/wiki/Advanced_Encryption_Standard) and/or Poly1305-AES message authentication codes (documented at http://cr.yp.to/mac.html).

At this point, the pairing is considered established, and secure communication between the controller and accessory using the keys established at blocks 850 and 852 is possible. Examples of specific processes for securely sending and receiving messages are described below.

As noted above, process 800 includes presenting passcodes to a user by the controller and the accessory and asking the user to verify that the passcodes match. In some embodiments, it may be inconvenient or impossible for certain devices to present a passcode to a user. For example, speaker accessory 120 as shown in FIG. 1 does not include any display capability; while such capability can be added, it may not be desirable (e.g., for cost or esthetic reasons) to do so. Thus, some embodiments provide for password-based authentication in addition to or instead of dynamic key negotiation.

In some embodiments, process 800 can be modified to reduce the number of probes exchanged to establish a pairing. For instance, the initial probe request sent by the controller at block 802 can include the controller public key CPUB, and the initial probe response sent by the accessory at block 808 can include the accessory public key APUB; in that case, sending of additional probes at blocks 824 and 832 can be omitted. If probes are not used in later steps, e.g., if the user can interact with each device separately to verify the passcode match (at blocks 846 and 848), the pairing can be created with as few as two probes (one request from the controller and one response from the accessory).

Figure 9A:
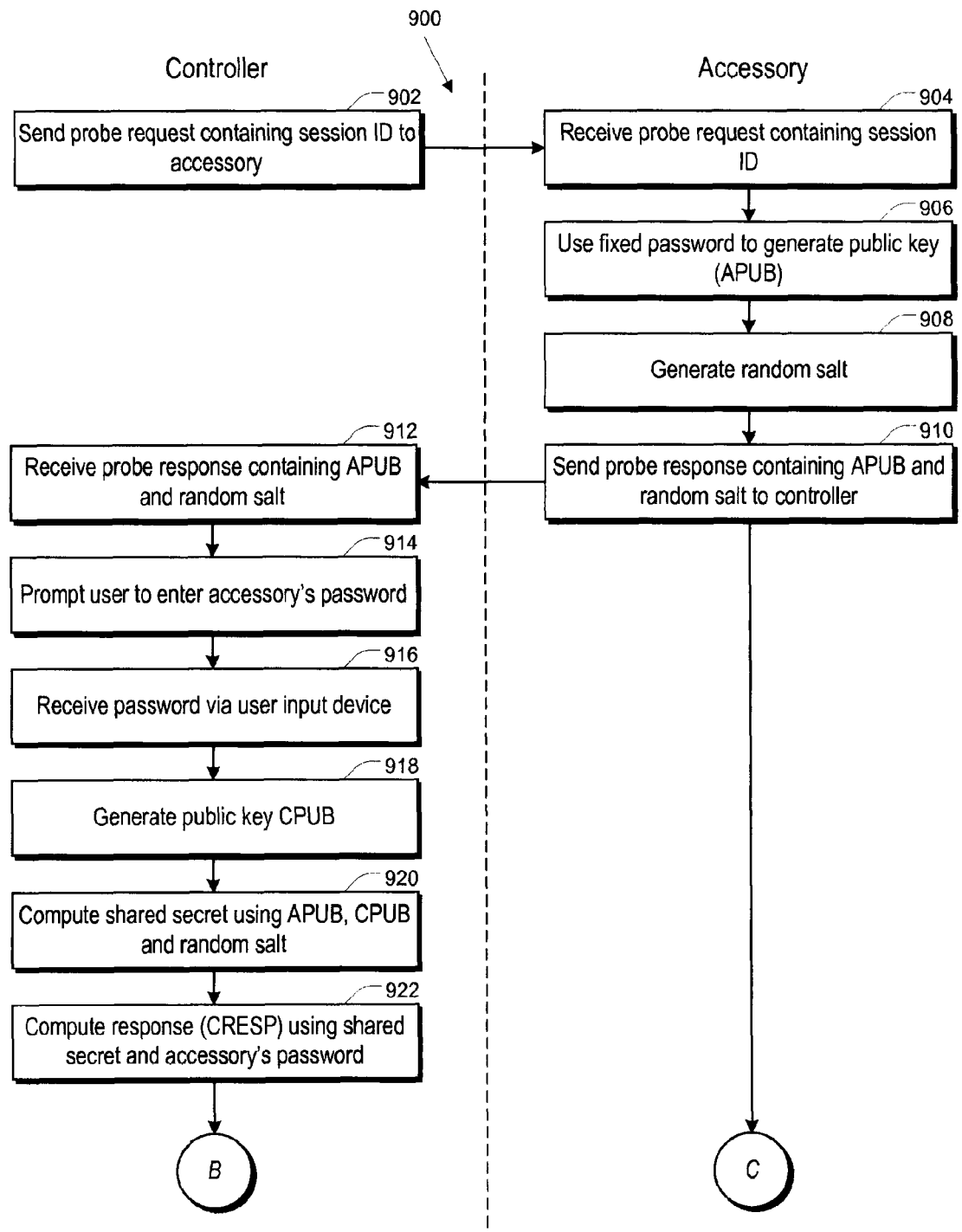
FIGS. 9A-9B are a flow diagram of a process for establishing a pairing between a controller and an accessory according to an embodiment of the present invention.
Figure 9B:
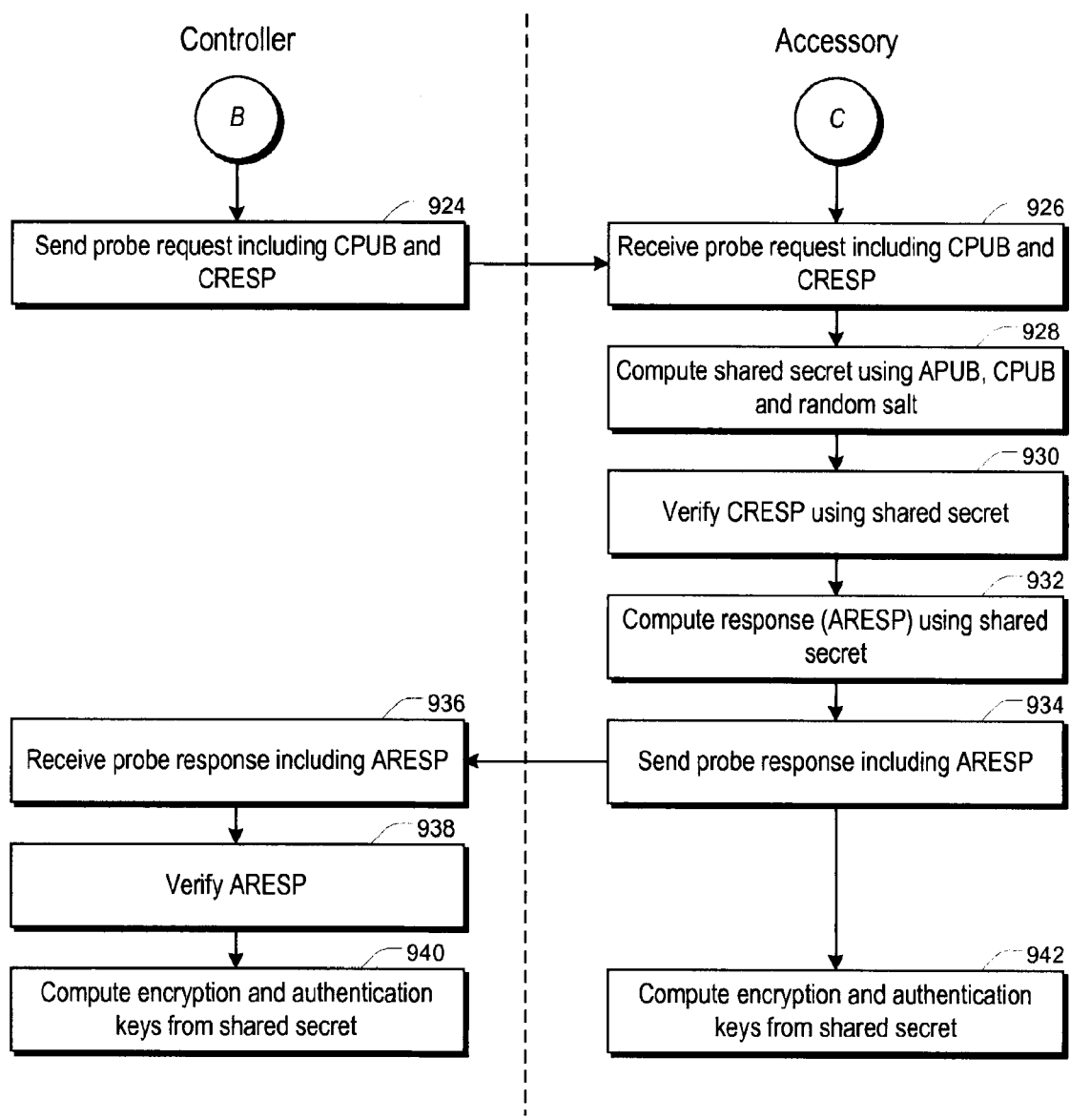

FIGS. 9A-9B are a flow diagram of a process 900 for password-based authentication according to an embodiment of the present invention. As indicated in FIG. 8A, processes 800 and 900 can both be available, with the controller determining which to use based on information provided by the accessory. In other embodiments, process 900 can be implemented without also implementing process 800, in which case all accessories would support password-based authentication.

Process 900 begins after the controller has received a probe request from an accessory indicating that the accessory is seeking to create a pairing. The probe request in this case can indicate that the accessory uses password-based authentication. At block 902, the controller can send a probe request containing a session ID to the accessory. As noted above, the session ID is assigned by the controller and is specific to a pairing with a particular accessory.

At block 904, the accessory can receive the probe request. In this embodiment, the accessory can have a fixed or preset password that is persistently stored in memory or other storage accessible to the accessory (e.g., accessory 400 of FIG. 4 has device password 412 stored in storage medium 408), and at block 906, the accessory can use this password to generate a public key ("APUB"). In one embodiment, the accessory uses Secure Remote Password ("SRP," documented at http://srp.standford.edu/) to generate public key APUB. At block 908, the accessory can generate a random salt, e.g., compliant with SRP. At block 910, the accessory can send a probe response containing the public key APUB and the random salt to the controller. This probe response, and all subsequent probe requests or probe responses, can also include the session ID that was provided by the controller at block 902.

At block 912, the controller can receive the probe response from the accessory. At block 914, the controller can prompt the user to enter the accessory's password into the controller. In this embodiment, it is assumed that the user can obtain the accessory's password. The password can be provided to the user, e.g., in documentation packaged with the accessory, on a decal affixed to the accessory, as an imprinted password on the accessory's body, or in some other manner. In some cases, the accessory serial number or other unique identifying code can be used as the password.

Given the range of options for communicating a password to a user, it can be helpful at block 914 to prompt or remind the user as to where the accessory's password is to be found. In some embodiments, the accessory can provide to the controller information as to where its password is located. For example, different location codes can be defined to indicate "left side," "right side," "top," "bottom," "front," "rear" and "documentation." The accessory can include the appropriate location code in an information element (or other data item) of a probe request or probe response, such as the initial probe request that the accessory sends to locate a pairing partner or the probe response sent at block 910 of process 900.

Figure 10:
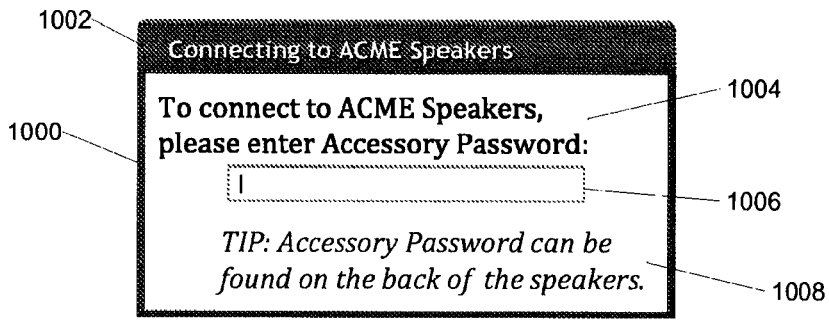
FIG. 10 illustrates a password prompt that can be displayed on a controller according to an embodiment of the present invention.

FIG. 10 illustrates a password prompt that can be displayed on a controller according to an embodiment of the present invention. A window 1000 contains the prompt. Title bar 1002 identifies the accessory that the controller is attempting to connect to, and prompt 1004 asks the user to enter the password in text box 1006. Tip message 1008 tells the user where the password can be located. In some embodiments, the controller can generate tip message 1008 by reading the location code from a probe request or probe response received from the accessory and selecting appropriate text depending on the location code.

Referring again to FIG. 9A, at block 916, the controller can receive the password via a user input device. In some embodiments, the user can instruct the controller to cancel or abort the pairing process rather than entering a password. At block 918, the controller can generate its own public key (CPUB); SRP or other techniques may be used. At block 920, the controller can compute a shared secret (e.g., using SRP) based on the accessory's public key APUB, the controller's public key CPUB, and the random salt received from the accessory. At block 920, the controller can compute a response ("CRESP"), e.g., using SRP, that demonstrates its knowledge of the accessory's password.

The remaining portions of process 900 are shown in FIG. 9B. At block 924, the controller can send a probe request that includes public key CPUB and response CRESP.

At block 926, the accessory can receive the probe request. At block 928, the accessory can compute a shared secret (e.g., using SRP) based on the accessory's public key APUB, the controller's public key CPUB and the random salt generated at block 908 (FIG. 9A). At block 930, the accessory can use the computed shared secret to verify the response CRESP received from the controller. In some embodiments, if verification fails, process 900 can terminate. Assuming the verification succeeds, at block 932, the accessory can compute its own response ("ARESP") to demonstrate that it too knows the accessory's password. At block 934, the accessory can send the response ARESP in a probe response to the controller.

At block 936, the controller can receive the probe response, and at block 938, the controller can verify the response ARESP. As at block 930, in some embodiments, a verification failure results in termination of process 900. If verification succeeds, at block 940, the controller can compute encryption and authentication keys based on the shared secret. As in process 800, these keys can be computed using AES and Poly1305-AES, respectively.

Similarly, once the accessory has validated the controller's response (CRESP), the accessory can also compute encryption and authentication keys based on the shared secret at block 942.

At this point, the pairing is established, and secure communication using the keys established at blocks 940 and 942 is possible. Examples of specific processes for securely sending and receiving messages are described below.

It will be appreciated that the pairing processes described herein are illustrative and that variations and modifications are possible. Steps described as sequential may be executed in parallel, order of steps may be varied, and steps may be modified, combined, added or omitted. For instance, the order in which various keys are generated can be varied. The accessory and the controller can perform certain computations concurrently.

While the embodiments described herein identify a particular sequence of probe requests and probe responses that can be used to establish a pairing, other embodiments may use different sequences of probes. (Accordingly, any use of ordinal numbers to distinguish among probes such as "first," "second," and so on should be understood as merely a distinguishing usage, not as requiring a particular temporal order among probes.) Moreover, additional probe requests and probe responses, not explicitly shown or described above, can also be used. For example, in some protocols, such as IEEE 802.11, a device that sends a probe requests expects to receive a probe response within a certain time period; if no response is received, the process that is waiting for a response can time out. In some embodiments, a device that receives a probe request can send a first probe response confirming receipt of the probe request and indicating (e.g., via an information element) how long the sender of the probe request should wait for a response. The requesting device can use the specified timeout to determine how long to wait for a response before resending a request or aborting a process. This allows a responding device to perform computations that may take more time than the default timeout period; the responding device can send a probe response within the timeout period to indicate that the requesting device should wait for the complete response.

It should also be noted that processes 800 and 900 can be implemented such that the controller sends only probe requests, not probe responses, while the accessory sends only probe responses, not probe requests. Thus, the controller need not be capable of detecting or responding to a probe request.

The identification of particular encryption and authentication technologies (AES, SRP, etc.) is illustrative, and other technologies can be substituted. It is expected that the controller and accessory use compatible technologies within a pairing, so that either device can successfully authenticate and decrypt messages sent by the other.

In some embodiments, a second accessory may attempt to pair with a controller while that controller is in the process of establishing a pairing with a first accessory. For instance, in the embodiment of FIG. 1, printer 110 may send a probe request seeking to initiate a pairing process while controller 100 is in the process of establishing a pairing with speakers 120. Controller 100 can be configured to handle this situation in various ways.

In some embodiments, once a first pairing process is initiated, the controller remains in the first process and ignores further probe requests attempting to initiate a pairing until the first process completes or is aborted. In other embodiments, if a second request to initiate a pairing is received while the first process is still continuing, the controller can abort the first process and begin a second pairing process based on the second request. The latter design choice can be helpful in the event that a user makes a mistake or changes her mind during the pairing process and wants to start over; the user need not wait for the first process to complete or time out. In still other embodiments, the controller can be configured to manage multiple pairing processes concurrently.

Similarly, it is possible that an accessory can receive browsing probes from multiple controllers. In some embodiments, the accessory can respond to the first controller from which a browsing probe is received and ignore any subsequent browsing probes until the pairing with the first controller ends. In other embodiments, if a browsing probe is received while a pairing is in progress (either established or in process of being established), the accessory can terminate the current pairing and begin a new pairing process by responding to the most recent browsing probe. In embodiments where the accessory has a user interface, the accessory can prompt the user as to whether a current pairing should be terminated in response to a new browsing probe.

Figure 11:
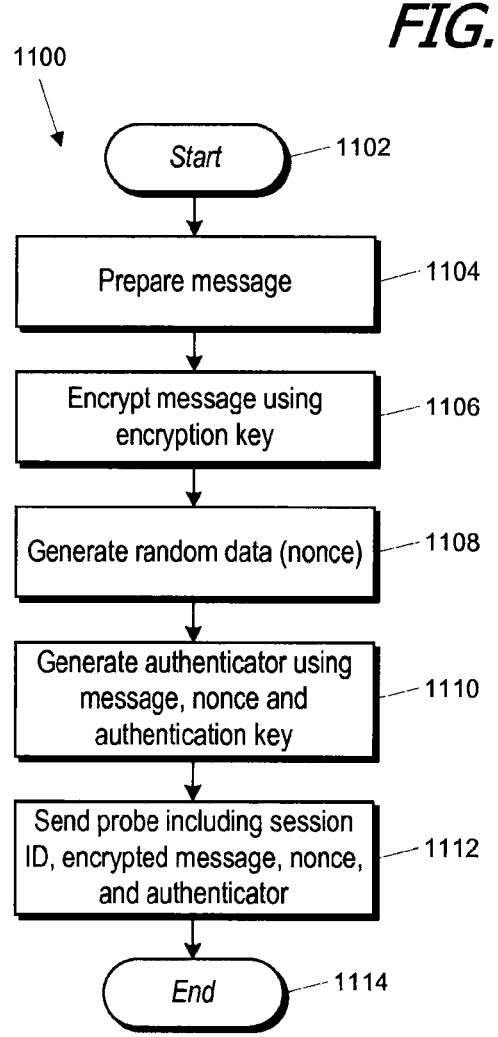
FIG. 11 illustrates a process that can be used by a sender (which can be either an accessory or a controller) to send a message to a recipient device that is paired with the sender according to an embodiment of the present invention.
Figure 12:
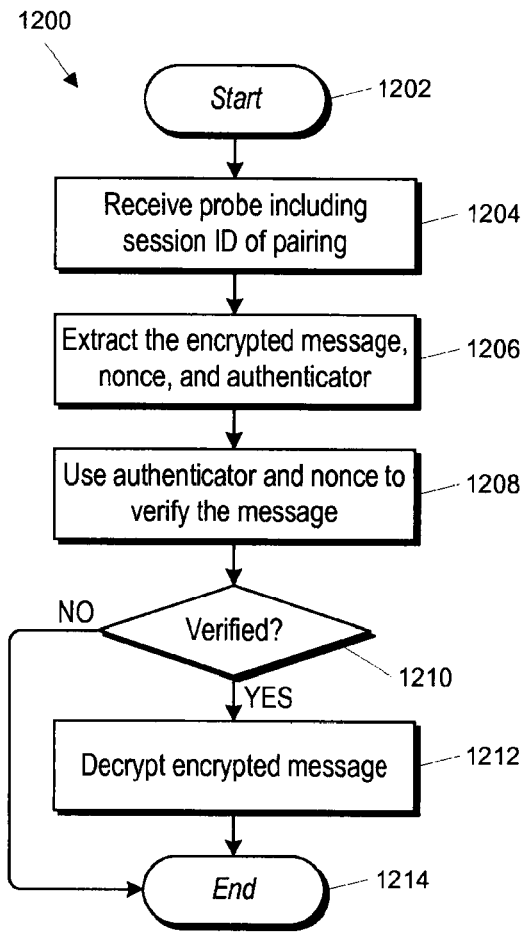
FIG. 12 illustrates a process that can be used by a recipient (which can be either a controller or an accessory) to receive a message from a sender device that is paired with the recipient according to an embodiment of the present invention.

As noted above, processes 800 and 900 result in the establishment of a pairing—a secure wireless link—between the controller and the accessory. Each device can validate the other, and the two devices can establish a shared secret that is difficult for any interlopers that may be monitoring the wireless communications to determine. Once established, the pairing can be used for secure (encrypted and/or authenticated) communication. FIGS. 11 and 12 are flow diagrams of processes for sending and receiving secure messages via a wireless pairing according to an embodiment of the present invention.

FIG. 11 illustrates a process 1100 that can be used by a sender (which can be either the accessory or the controller) to send a message to a recipient device that is paired with the sender according to an embodiment of the present invention. Process 1100 starts (block 1102) after a pairing has been established, e.g., using any of the processes described above. At block 1104, the sender can prepare a message that is to be sent securely. This can include, e.g., generating data, retrieving stored information, formatting or encoding data, etc. At block 1106, the sender can encrypt the message using the encryption key associated with the pairing (e.g., an AES key that was generated using any of the processes described above). At block 1108, the sender can generate random data, e.g., 16 bytes, to be used as a nonce for authentication purposes. At block 1110, the sender can generate an authenticator (a data block) based on the message, the nonce, and the authentication key associated with the pairing (e.g., a Poly1305-AES code that was generated using any of the processes described above).

At block 1112, the sender can send a probe (which can be a probe request or probe response) that includes the encrypted message, the nonce, and the authenticator data block. These items can be included as information elements or other data elements within the probe. The sender can also include in the probe a session ID associated with the pairing. In some embodiments, only the message itself is encrypted; other items such as the session ID and nonce are not. (The authenticator can be generated using cryptographic techniques but is not further encrypted.) Once the probe request is sent, process 1100 can end (block 1114).

FIG. 12 illustrates a process 1200 that can be used by a recipient (which can be either the controller or the accessory) to receive a message from a sender device that is paired with the recipient according to an embodiment of the present invention. In this example, it is assumed that the message was sent using process 1100 of FIG. 11 Process 1200 starts (block 1202) after a pairing has been established, e.g., using any of the processes described above. At block 1204, the recipient can receive a probe (which can be a probe request or probe response) that includes a session identifier associated with the pairing. At block 1206, the recipient can extract the encrypted message, the nonce, and the authenticator block from the probe. At block 1208, the recipient can use the authenticator and the nonce, together with its own authentication key (e.g., its Poly1305-AES code as described above) to verify the authenticity of the message. If authenticity is verified at block 1210, the recipient can proceed to decrypt the encrypted message at block 1212. In this embodiment, if the authenticity is not verified at block 1210, the recipient can simply ignore the message.

Process 1200 ends at block 1214. Assuming the message was authenticated and decrypted, the recipient can act on the message, with the specific action depending on the content of the message. As previously noted, any type of configuration information, control signals, or other data can be included in an encrypted message sent using a probe. In some embodiments, responding to the message may include sending an encrypted message back to the sender using a probe. In that case, the recipient becomes the sender using process 1100; thus, the same device can operate as a sender at one time and as a recipient at another time.

It will be appreciated that the communication processes described herein are illustrative and that variations and modifications are possible. Steps described as sequential may be executed in parallel, order of steps may be varied, and steps may be modified, combined, added or omitted. Other encryption techniques can be substituted for techniques identified herein.

As noted, processes 1100 and 1200 can be used to communicate any information desired between the accessory and the controller. In some embodiments, the controller can be joined to a conventional wireless network (e.g., an IEEE 802.11-compliant network) while pairing with an accessory. Once the pairing is established, the controller can use the secure link to provide the accessory with the credentials (e.g., network name and password) it needs to join the wireless network.

Figure 13:
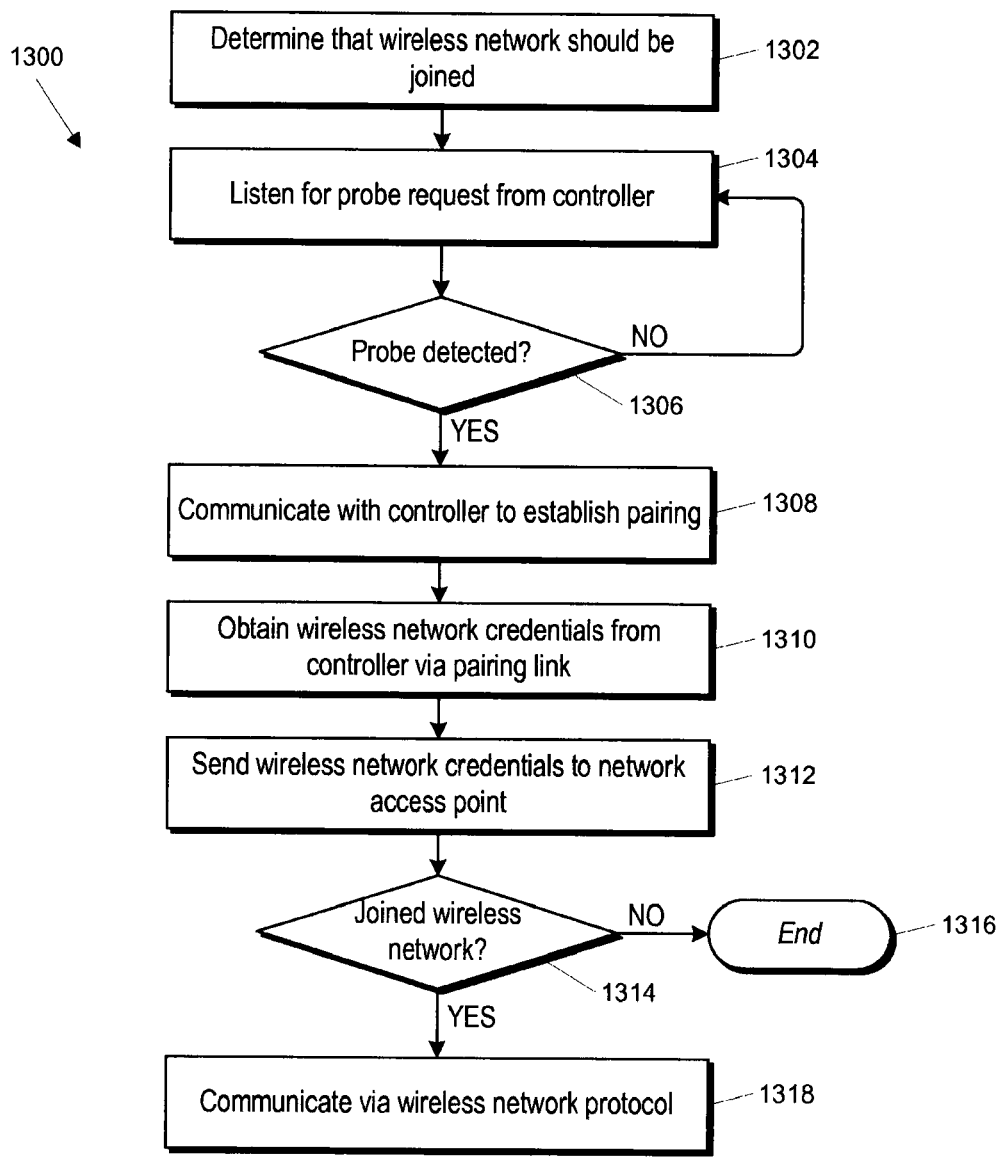
FIG. 13 is a flow diagram of a process that can be used by an accessory to join a wireless network according to an embodiment of the present invention.

FIG. 13 is a flow diagram of a process 1300 that can be used by an accessory (e.g., accessory 110 or 120 of FIG. 1) to join a wireless network according to an embodiment of the present invention. In this process, it is assumed that the wireless network is managed by an access point that determines whether other devices can join the network and access various resources (e.g., the Internet) via the access point.

Process 1300 begins at block 1302, in which the accessory determines that it should attempt to join a wireless network. This determination can be made automatically at device startup, in response to user input, or under other circumstances. At block 1304, the accessory can listen for a browsing probe request from a controller capable of establishing a pairing with the accessory. The controller can be but need not be the network access point, and it is not required that the accessory have any information as to the existence of or access credentials for any wireless networks.

At block 1306, the accessory can determine whether a browsing probe has been detected. If no browsing probe is detected, the accessory can continue to listen (block 1304) or end process 1300. If a browsing probe is detected, then at block 1308, the accessory can communicate with the controller (e.g., using further probes) to establish a pairing. For example, processes 800 and/or 900 described above can be used.

Once the pairing is established, at block 1310, the accessory can obtain credentials (e.g., network name and password) for a wireless network from the controller via the pairing link. For example, processes 1100 and 1200 described above can be used, with the wireless network credentials being included in an encrypted message sent by the controller to the accessory, e.g. in a probe request. The controller can be, but need not be, joined to the wireless network at the time it supplies the credentials to the accessory. In some embodiments, the accessory does not explicitly request network credentials; a controller can be configured to send the credentials automatically (e.g., in a probe request) once the pairing is established. In other embodiments, block 1310 can include sending a request for the credentials to the controller, e.g., using a probe.

At block 1312, the accessory can send the wireless network credentials to the network access point. Conventional techniques, such as WEP, WPA or WPA2 (in the case of IEEE 802.11-compliant networks) can be used to transmit the credentials, or information derived from the credentials, securely to the access point.

At block 1314, the accessory can wait for confirmation as to whether it successfully joined the network. If not, process 1300 can end at block 1316, or the accessory can retry (e.g., returning to block 1312 to resend the credentials or to block 1310 to obtain new credentials).

After joining the network, the accessory can communicate with other devices on the network using the wireless network protocol (block 1318). In some embodiments, the pairing with the controller can be terminated once the accessory has joined the wireless network. In other embodiments, the pairing session can remain open indefinitely, allowing the controller and the accessory to communicate in a sideband, regardless of whether either device remains joined to the wireless network.

Figure 14:
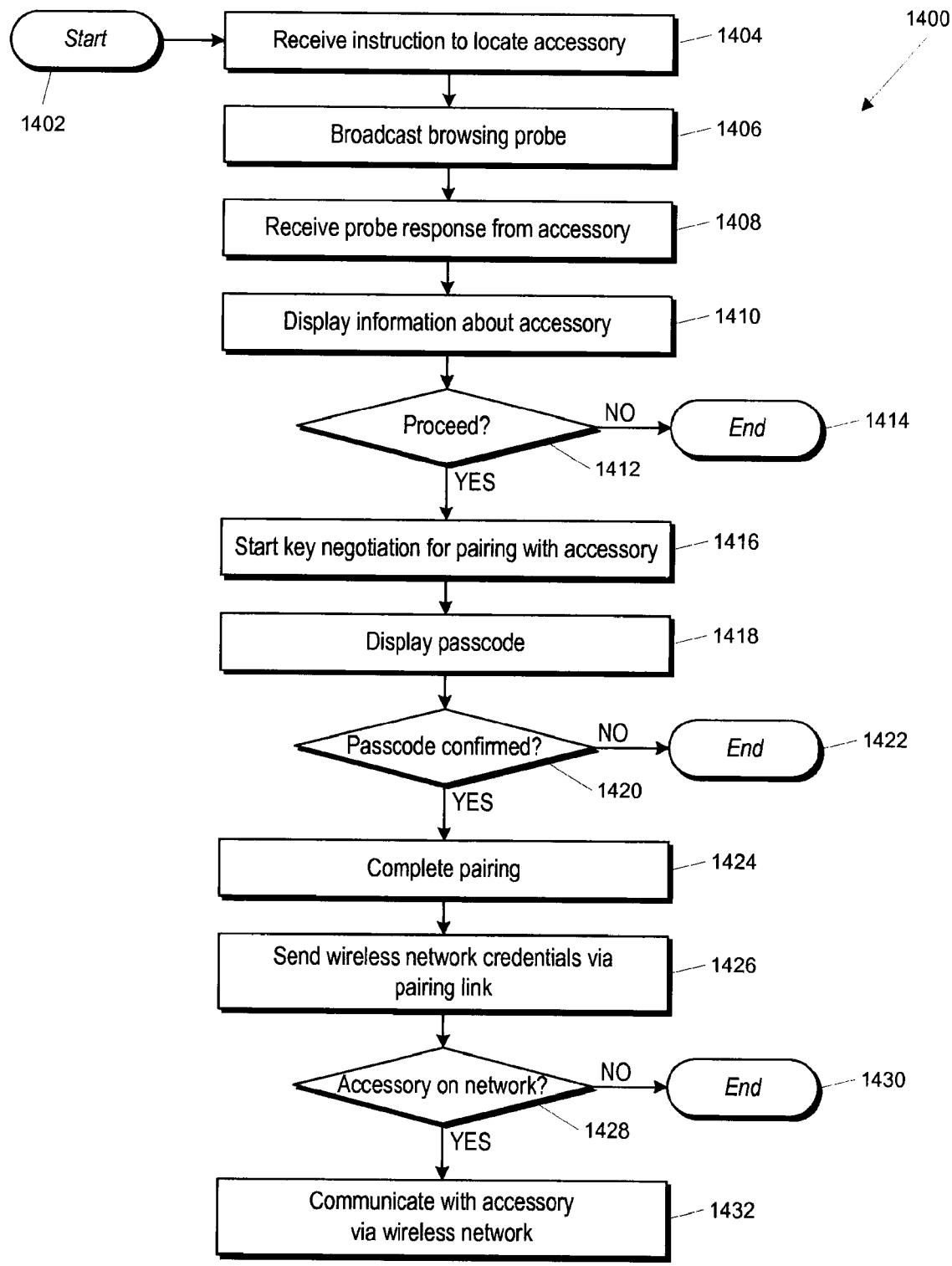
FIG. 14 is a flow diagram of a process that can be executed by a controller to facilitate joining an accessory to a wireless network according to an embodiment of the present invention.

In some embodiments, a user can control the pairing and network joining process by interacting with the controller. FIG. 14 is a flow diagram of a process 1400 that can be executed by a controller to facilitate joining an accessory to a wireless network according to an embodiment of the present invention.

Process 1400 starts (block 1402) when the controller is prepared to pair with a wireless accessory. For example, the user can launch an application program on the controller that provides a control interface for communicating with wireless devices. In some embodiments, this program can be a program for playing media assets that is capable of streaming digital media data via a wireless network to an accessory (for example, the iTunes® media asset management program provided by Apple Inc., assignee of the present application).

At block 1404, the controller can receive an instruction from the user to locate a wireless accessory. For example, the user can interact with the application program to instruct the controller to search for wireless accessories. At block 1406, the controller can broadcast a browsing probe, e.g., a probe request indicating that the controller is searching for accessories with which to pair.

At block 1408, the controller can receive a probe response from the accessory. As described above, this probe response can include information about the accessory. At block 1410, the controller can display information about the accessory (e.g., information extracted from the probe response) to the user. At block 1412, the controller can receive confirmation from the user that pairing should proceed. If confirmation is not received, process 1400 can end (block 1414) or return to block 1406 to search for a probe request from a different accessory.

Once confirmation is received at block 1412, the controller can begin a key negotiation process with the accessory at block 1416 (e.g., process 800 described above). At block 1418, as part of the key negotiation, the controller can display a passcode for user confirmation, e.g., as described above. At block 1420, the user can confirm the passcode. If the passcode is not confirmed, process 1400 can end at block 1422 or return to an earlier block to try again. If the passcode is confirmed, the controller can complete the pairing (e.g., completing process 800) at block 1424. In some embodiments, completing the pairing can include sending a probe to the accessory to confirm that the pairing has been established.

Once the pairing is established, at block 1426, the controller can send wireless network credentials to the accessory via the pairing link, e.g., using processes 1100 and 1200 described above, with the wireless network credentials being included in an encrypted message sent by the controller to the accessory, e.g., in a probe request. In some embodiments, the controller can obtain user input to select a network for the accessory to join, or it can automatically select a wireless network to which the controller is already joined or a preferred wireless network that has previously been identified (e.g., by the user). In some embodiments, the controller can be configured to send the credentials to the accessory automatically (e.g., in a probe request) once the pairing is established. In other embodiments, block 1426 can include receiving a request for the credentials from the accessory; such a request can be sent via the pairing link using a probe.

At block 1428, the controller can determine whether the accessory has joined the network. If not, process 1400 can end at block 1430 or return to an earlier stage to retry, or process 1400 can wait at block 1428 until the accessory joins or until other user instructions are received. Once the accessory has joined the network, the controller can communicate with the accessory via the wireless network at block 1432, e.g., to stream media data to the accessory.

Figure 15:
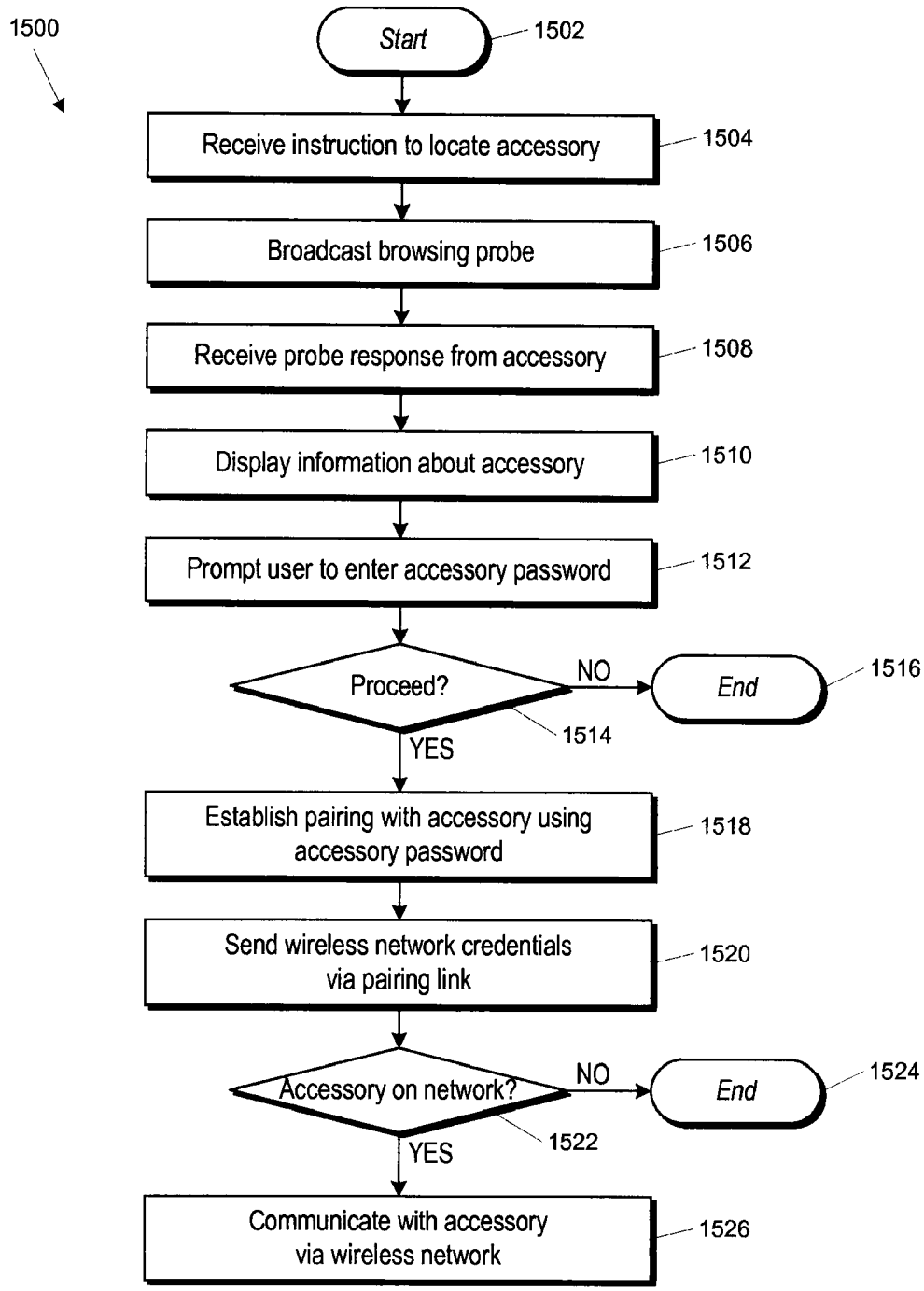
FIG. 15 is a flow diagram of a process that can be used by a controller to facilitate joining an accessory to a wireless network according to an embodiment of the present invention.

As noted above, in some embodiments a pairing can be established using password-based authentication rather than key negotiation. FIG. 15 is a flow diagram of a process 1500 that can be used by a controller to facilitate joining an accessory that supports password-based authentication to a wireless network according to an embodiment of the present invention.

Process 1500 starts (block 1502) when the controller is prepared to pair with a wireless accessory. At block 1504, the controller can receive an instruction from the user to locate a wireless accessory. At block 1506, the controller can broadcast a browsing probe, and at block 1508, the controller can receive a probe response from the accessory. These blocks can be generally similar to corresponding blocks in process 1400 described above.

At block 1510, the controller can display information about the accessory to the user. In this example, the probe response from the accessory received at block 1508 can include an indication that the accessory uses password-based authentication, and at block 1512, the controller can prompt the user to enter the accessory password, e.g., using the prompt screen of FIG. 10. At block 1514, entry of the password can serve as confirmation that the controller should proceed; if a password is not entered (e.g., the user cancels the operation), process 1500 can end at block 1516.

At block 1518, the controller can establish a pairing with the accessory based in part on the password supplied by the user at block 1510 (e.g., according to process 900 described above).

Once the secure pairing link is established, at block 1520, the controller can send wireless network credentials to the accessory via that link. This can be generally similar to block 1426 of process 1400 described above.

At block 1522, the controller can determine whether the accessory has joined the network. If not, process 1500 can end at block 1524 or return to an earlier stage to retry, or the controller can wait at block 1522 until the accessory joins or until other user instructions are received. Once the accessory has joined the network, the controller can communicate with the accessory via the wireless network at block 1526, e.g., to stream media data to the accessory.

It will be appreciated that the network-joining processes described herein are illustrative and that variations and modifications are possible. Steps described as sequential may be executed in parallel, order of steps may be varied, and steps may be modified, combined, added or omitted. An accessory and a controller can use a variety of techniques to establish a pairing, allowing the accessory to obtain credentials for a wireless network, which the accessory can then join. Further, while the controller is described as providing wireless network credentials to the accessory, it will be appreciated that a pairing as described herein can support two-way communication, and it is also possible for the accessory to provide network credentials (or other configuration information or control signals) to the controller.

While the invention has been described with respect to specific embodiments, one skilled in the art will recognize that numerous modifications are possible. For instance, while it is contemplated that the invention can be practiced in the context of IEEE 802.11-compliant wireless networks using probe request and probe response frames as defined for such networks, with vendor-specific information elements included to provide the various data items described above, it is also contemplated that other wireless protocols (existing or future) can include message formats usable to communicate information between devices that have not yet joined a network. Embodiments of the present invention can be adapted for such protocols as well. Thus, while particular information is described herein as being included in a probe request or probe response, such usage is illustrative, and the general term "probe" can be understood as encompassing probe requests and probe responses and other message formats that can be exchanged between two wireless devices that are not currently joined to a common network.

In embodiments described above, a pairing process can be initiated by a controller broadcasting a browsing probe request, to which an accessory desiring pairing can respond. As noted above, a controller in such embodiments need not be capable of receiving or responding to a probe request. In some alternative embodiments, a pairing process can be initiated by an accessory broadcasting a probe request, to which a controller can respond to indicate that it is available to pair with the accessory.

Further, although reference has been made to specific cryptographic techniques for purposes of illustration, it is to be understood that the present invention is not limited to any particular cryptographic techniques, provided that the controller and the accessory use compatible techniques.

While the embodiments described above may make reference to specific hardware and software components, those skilled in the art will appreciate that different combinations of hardware and/or software components may also be used and that particular operations described as being implemented in hardware might also be implemented in software or vice versa.

Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

What is claimed is:

1. A method for use in a wireless controller device, the method comprising: at the wireless controller device: performing a search to identify nearby wireless accessory devices; receiving, responsive to the search, identifying information for one or more wireless accessory devices; displaying the identifying information in a graphical user interface; receiving user input that selects a wireless accessory device from the one or more wireless accessory devices; communicating with the selected wireless accessory device to establish an encrypted wireless connection with the selected wireless accessory device, wherein communicating further comprises : exchanging messages to perform a dynamic key negotiation for generating an encryption key and an authentication key; or exchanging messages to generate the encryption key and the authentication key using a password by: receiving a first message from the selected wireless accessory device that includes a random salt and a first public key that was generated based on the password; transmitting a second message to the selected wireless accessory device, wherein the second message is responsive to the first message, and wherein the second message includes a second public key; computing a shared secret using the first public key, the second public key, and the random salt; and computing encryption and authentication keys from the shared secret; transmitting network credentials to the selected wireless accessory device via the encrypted wireless connection, wherein the network credentials include an identifier of a wireless network and a password for connecting to the wireless network, wherein the network credentials are usable by the selected wireless accessory device to connect to the wireless network; joining the wireless network; and communicating with the selected wireless accessory device via the wireless network.

2. The method of claim 1, wherein the performing the dynamic key negotiation for generating the encryption key and the authentication key includes: transmitting a first message to the selected wireless accessory device, wherein the first message includes a first public key, and wherein the first public key is usable by the selected wireless accessory device to generate a second public key; receiving a second message from the selected wireless accessory device, wherein the second message is responsive to the first message and includes the second public key; using the first public key and the second public key to compute a shared secret; and computing encryption and authentication keys from the shared secret.

3. The method of claim 1, wherein the transmitting the network credentials to the selected wireless accessory device includes transmitting a message that includes an encrypted version of the network credentials, a nonce, and an authenticator.

4. The method of claim 1, wherein the communicating with the selected wireless accessory device to establish the encrypted wireless connection is performed using IEEE 802.11 technology.

5. The method of claim , wherein the selected wireless accessory device is a printer.

6. The method of claim 1, wherein the selected wireless accessory device is a speaker.

7. A method for use in a wireless accessory device, the method comprising: at the wireless accessory device: communicating with a wireless controller device to establish encryption between the wireless accessory device and a wireless controller device, wherein communicating further comprises : using corresponding probe requests and probe responses to perform a dynamic key negotiation for generating an encryption key and an authentication key; or using corresponding probe requests and probe responses to generate the encryption key and the authentication key using a password by: using the password to generate a first public key; generating a random salt; sending a probe response that includes the first public key and the random salt to the wireless controller device receiving, from the wireless controller device, a probe request including a second public key; computing a shared secret using the first public key, the second public key, and the random salt; and computing encryption and authentication keys from the shared secret; receiving a message from the wireless controller device, wherein the message includes an encrypted version of network credentials, wherein the encrypted version of the network credentials is encrypted according to the encryption established between the wireless accessory device and the wireless controller device, and wherein the network credentials include: an identifier of a wireless network; and a password for accessing the wireless network; joining the wireless network, wherein joining the wireless network includes sending the network credentials to an access point that manages communication on the wireless network; and communicating with one or more devices via the wireless network.

8. The method of claim 7, wherein the performing the dynamic key negotiation for generating the encryption key and the authentication key includes: receiving, from the wireless controller device, a probe request comprising a first public key; generating a second public key; sending a probe response comprising the second public key to the wireless controller device; using the first public key and the second public key to compute a shared secret; and computing encryption and authentication keys from the shared secret.

9. The method of claim 7, wherein the message received from the wireless controller device further includes a nonce and an authenticator, and wherein the method further comprises:
 extracting the encrypted version of the network credentials, the nonce, and the authenticator from the message;
 verifying authenticity of the message using the authenticator, the nonce, and an authentication key; and
 when the authenticity of the message is verified, decrypting the encrypted version of the network credentials.

10. The method of claim 7, wherein the communicating with the wireless controller device to establish the encryption between the wireless accessory device and the wireless controller device is performed using IEEE 802.11 technology.

11. The method of claim 7, wherein the communicating with the wireless controller device to establish an encryption between the wireless accessory device and the wireless controller device includes:
 sending a probe response to the wireless controller device, the probe response comprising identifying information for the wireless accessory device, the identifying information configured to enable the wireless controller device to present a message on a display of the wireless controller device for confirming that a pairing process with the wireless accessory device should proceed.

12. The method of claim 7, wherein the wireless accessory device is a speaker or a printer.

13. An electronic device, comprising: a wireless interface; and a processor coupled to the wireless interface; wherein the wireless interface and the processor are configured to: communicate with a wireless accessory device to establish encryption between the wireless accessory device and the electronic device, wherein communicating further comprises:
 exchanging messages to perform a dynamic key negotiation for generating an encryption key and an authentication key; or exchanging messages to generate the encryption key and the authentication key using a password by: receiving a first message from the wireless accessory device that includes a random salt and a first public key that was generated based on the password; transmitting a second message to the wireless accessory device, wherein the second message is responsive to the first message, and wherein the second message includes a second public key; computing a shared secret using the first public key, the second public key, and the random salt; and computing encryption and authentication keys from the shared secret; and
 transmit an encrypted version of network credentials to the wireless accessory device, wherein the network credentials include an identifier of a wireless network and a password for connecting to the wireless network, and wherein the network credentials are usable by the wireless accessory device to connect to the wireless network.

14. The electronic device of claim 13, wherein the wireless interface and processor are further configured to:
 communicate with an access point that manages the wireless network to join the wireless network; and
 communicate with the wireless accessory device via the wireless network.

15. The electronic device of claim 13, wherein the wireless interface and the processor are further configured to:
 perform a search to identify nearby wireless accessory devices;

display identifying information for nearby wireless accessory devices received via the search in a graphical user interface; and
receive user input that selects the wireless accessory device in the graphical user interface.

* * * * *